United States Patent
Tange et al.

(10) Patent No.: US 7,778,759 B2
(45) Date of Patent: Aug. 17, 2010

(54) LANE DEVIATION AVOIDANCE SYSTEM

(75) Inventors: Satoshi Tange, Kanagawa (JP); Genpei Naito, Yokohama (JP); Shinji Matsumoto, Kanagawa (JP); Masayasu Shimakage, Yokohama (JP); Hidekazu Nakajima, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/049,972

(22) Filed: Feb. 4, 2005

(65) Prior Publication Data

US 2005/0177308 A1    Aug. 11, 2005

(30) Foreign Application Priority Data

Feb. 6, 2004    (JP) .............................. 2004-030740
Feb. 6, 2004    (JP) .............................. 2004-030741
Nov. 30, 2004  (JP) .............................. 2004-346289

(51) Int. Cl.
*G08G 1/16*    (2006.01)
*G06G 7/00*    (2006.01)

(52) U.S. Cl. ............................... 701/96; 701/1; 701/36; 701/41; 701/70; 701/300; 701/301; 340/435; 340/436; 340/438; 340/903

(58) Field of Classification Search ................ 340/435, 340/436, 438, 903, 1, 36, 41, 70, 96, 300, 340/301; 701/41, 70, 117, 301, 30.1, 1, 36, 701/96, 300, 435, 436, 438, 903
See application file for complete search history.

(56) References Cited

U.S. PATENT DOCUMENTS

| | | | | |
|---|---|---|---|---|
| 6,411,901 B1 * | 6/2002 | Hiwatashi et al. | ........... | 701/301 |
| 6,487,501 B1 * | 11/2002 | Jeon | ........................... | 701/301 |
| 6,628,210 B2 * | 9/2003 | Lee | ............................. | 340/988 |
| 6,708,098 B2 * | 3/2004 | Matsumoto et al. | ........... | 701/70 |
| 6,970,787 B2 * | 11/2005 | Matsumoto et al. | ......... | 701/301 |
| 6,973,380 B2 * | 12/2005 | Tange et al. | .................... | 701/70 |
| 6,993,425 B2 * | 1/2006 | Tange et al. | .................... | 701/96 |
| 7,058,494 B2 * | 6/2006 | Matsumoto et al. | ........... | 701/41 |
| 7,155,341 B2 * | 12/2006 | Kimura et al. | ............... | 701/301 |
| 2002/0056583 A1 * | 5/2002 | Takano et al. | ............... | 180/197 |
| 2002/0134602 A1 * | 9/2002 | Kobayashi et al. | .......... | 180/169 |
| 2002/0177935 A1 * | 11/2002 | Winner et al. | ................. | 701/93 |
| 2003/0028311 A1 * | 2/2003 | Seto et al. | ...................... | 701/96 |
| 2003/0062769 A1 * | 4/2003 | Matsumoto et al. | ......... | 303/146 |
| 2003/0097206 A1 * | 5/2003 | Matsumoto et al. | ............ | 701/1 |
| 2003/0195667 A1 * | 10/2003 | Tange et al. | ..................... | 701/1 |
| 2004/0090319 A1 * | 5/2004 | Kimura et al. | .............. | 340/435 |

(Continued)

FOREIGN PATENT DOCUMENTS

EP    1 086 854 A2    3/2001

(Continued)

*Primary Examiner*—Jack Keith
*Assistant Examiner*—Chuong P Nguyen
(74) *Attorney, Agent, or Firm*—Foley & Lardner LLP

(57) ABSTRACT

A lane deviation avoidance system is arranged to execute a lane deviation avoidance control of controlling a vehicle behavior of the host vehicle so as to avoid the host vehicle from deviating from a traveling lane when the lane deviation tendency is detected, to suppress the driving force when the lane deviation tendency is detected, and to set a controlled variable of the lane deviation avoidance control according to a degree of the suppression of the driving force.

13 Claims, 16 Drawing Sheets

U.S. PATENT DOCUMENTS

| | | | |
|---|---|---|---|
| 2004/0098197 A1* | 5/2004 | Matsumoto et al. | 701/301 |
| 2004/0107035 A1* | 6/2004 | Tange et al. | 701/70 |
| 2004/0128057 A1* | 7/2004 | Kitazawa et al. | 701/110 |

FOREIGN PATENT DOCUMENTS

| | | | |
|---|---|---|---|
| EP | 1 087 360 A2 | | 3/2001 |
| EP | 12980121 | * | 2/2003 |
| JP | 2000-033860 A | | 2/2000 |
| JP | 2001310719 | * | 11/2001 |
| JP | 2003-306135 A | | 10/2003 |

* cited by examiner

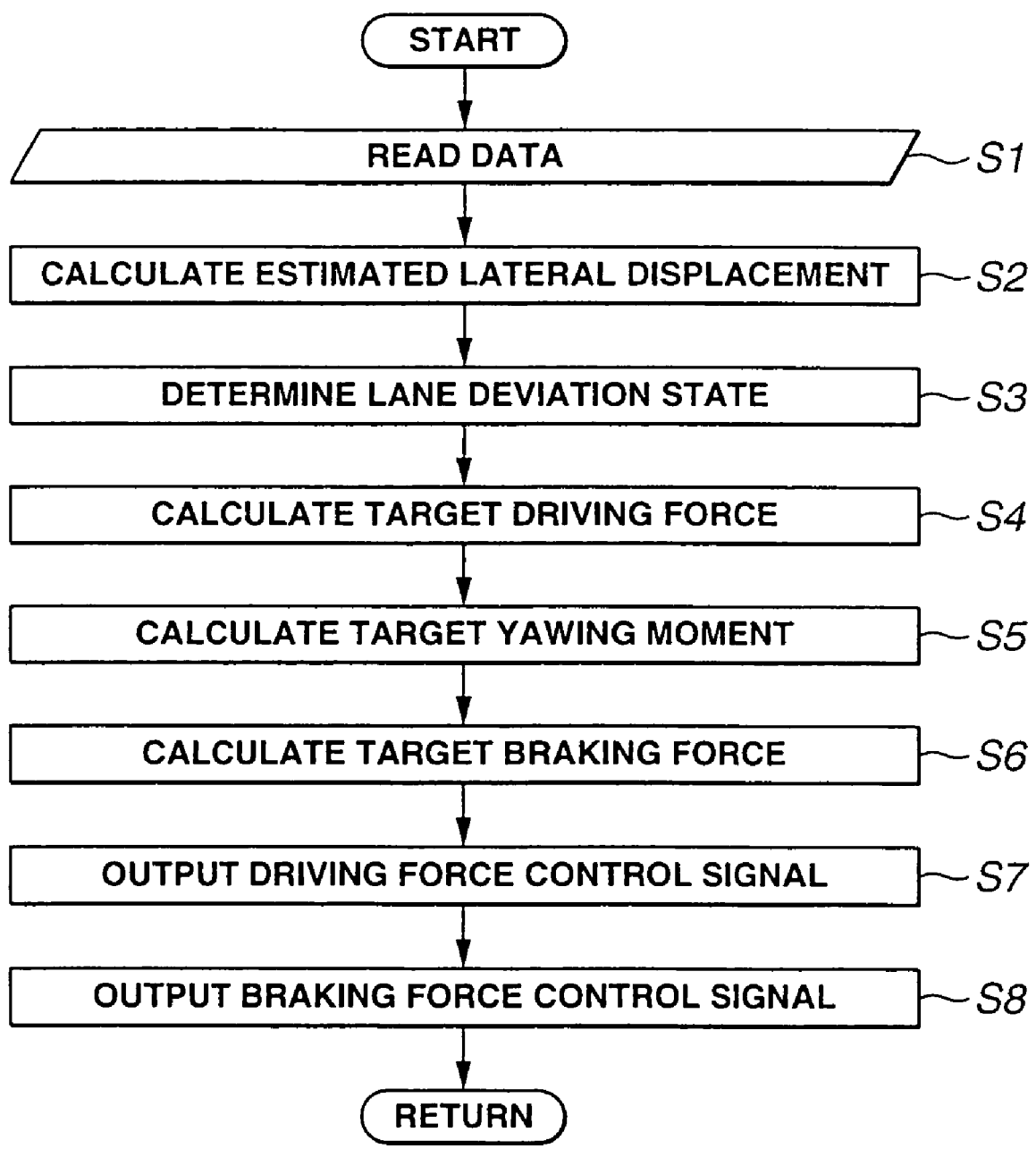

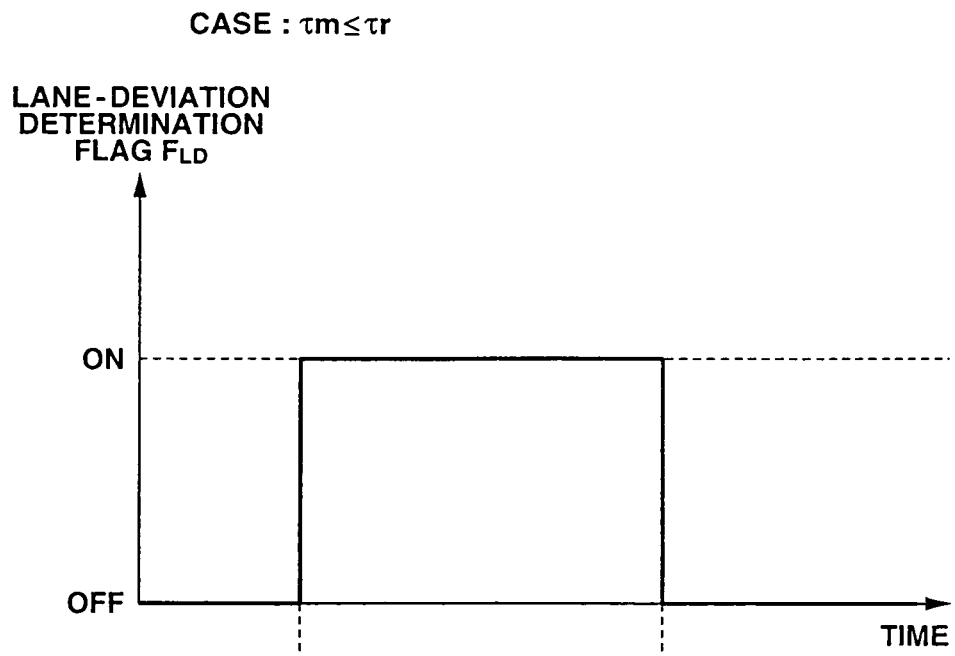
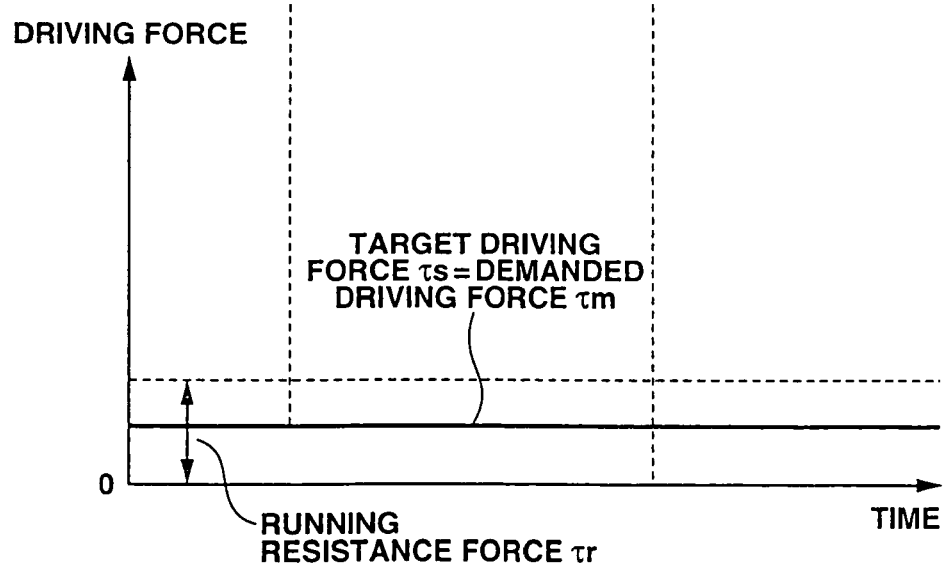

LANE DEVIATION AVOIDANCE SYSTEM

BACKGROUND OF THE INVENTION

The present invention relates a lane deviation avoidance system of preventing a lane deviation of a host vehicle when the host vehicle tends to deviate from a traveling lane under a traveling condition.

Japanese Published Patent Application No. 2000-33860 discloses a lane deviation avoidance system which prevents a host vehicle from deviating from a traveling lane by generating a braking force at a wheel located at an opposite side to a deviating direction of the host vehicle.

Japanese Published Patent Application No. 2003-306135 (≈U.S. Patent Application No. 20030195667) discloses another lane deviation avoidance system which is arranged to execute one of a generation of a driving force according to a driver's operation and a braking force for a lane deviation avoidance with a priority so as to prevent an interference between the driving force to be generated by the driver's operation and the braking force for a lane deviation avoidance.

SUMMARY OF THE INVENTION

When a driving force is generated according to an accelerator pedal manipulation by a driver, it is possible to prevent the interference between the braking force for the lane deviation avoidance and the driving force by limiting one of a braking force control for the lane deviation and the generation of the driving force. However, when the host vehicle is put in a lane deviation tendency and the acceleration pedal manipulation is being executed, suppressing the control for the lane deviation avoidance decreases a lane deviation avoidance effect of the lane deviation avoidance control under a condition that the driving force is generated according to the accelerator pedal manipulation. Inversely, when the driving force is suppressed under the above-discussed condition and the host vehicle is put in the lane deviation tendency by the driver's intent such as a lane change, the driver may have a strange feeling from a vehicle behavior that the driving force is insufficiently generated regardless of the accelerator manipulation and a yawing moment is generated for the lane deviation avoidance.

Further, when the lane deviation avoidance is achieved by generating a braking force according to a lateral displacement of the host vehicle through the control of a braking force actuator, a braking force for the lane deviation avoidance is further applied to the host vehicle. If such a braking force is further applied to the host vehicle under a condition that a running resistance of the host vehicle is large, such as a condition that the host vehicle travels on an upslope, the lowering of a vehicle speed becomes large as compared with that under a small running resistance condition such as a flat road traveling condition. Accordingly, an intervention into the control of the lane deviation avoidance under the large running resistance condition increases a vehicle deceleration feeling of the driver, and the driver feels it strange.

Although the suppression of a controlled variable of the lane deviation avoidance control enables the suppression of a deceleration feeling applied to the driver, the control effect of the lane deviation avoidance control is decreased thereby.

It is therefore an object of the present invention to provide a lane deviation avoidance system which is capable of accurately executing a lane deviation avoidance control under a condition that both of the driving force and a braking force for the lane deviation avoidance control are generated.

An aspect of the present invention is resides in a lane deviation avoidance system which comprises a driving force generating unit generating a driving force according to a demanded quantity and a control unit. The control unit is configured to detect a lane deviation tendency of a host vehicle, to execute a lane deviation avoidance control of controlling a vehicle behavior of the host vehicle so as to avoid the host vehicle from deviating from a traveling lane when the lane deviation tendency is detected, to detect the demanded quantity indicative of a demanded driving force, to suppress the driving force when the lane deviation tendency is detected, and to set a controlled variable of the lane deviation avoidance control according to a degree of the suppression of the driving force.

Another aspect of the present invention resides in a lane deviation avoidance system which comprises a driving force generating unit generating a driving force according to a demanded quantity and a control unit. The control unit is configured to detect a lane deviation tendency of a host vehicle, to execute a lane deviation avoidance control of controlling a vehicle behavior of the host vehicle so as to avoid the host vehicle from deviating from a traveling lane of the host vehicle when the lane deviation tendency is detected, to detect the demanded quantity indicative of a demanded driving force, to suppress the driving force when the lane deviation tendency is detected, to estimate a lane change intent of a driver on the basis of the demanded quantity, and to recover the driving force when it is estimated that the driver has the lane change intent.

A further aspect of the present invention resides in a method of avoiding a lane deviation of a host vehicle which comprises an operation of detecting a lane deviation tendency of a host vehicle; an operation of executing a lane deviation avoidance control of controlling a vehicle behavior of the host vehicle so as to avoid the host vehicle from deviating from a traveling lane when the lane deviation tendency is detected; an operation of generating a driving force according to a demanded quantity; an operation of detecting the demanded quantity indicative of a demanded driving force; an operation of suppressing the driving force when the lane deviation tendency is detected; and an operation of setting a controlled variable of the lane deviation avoidance control according to a degree of the suppression of the driving force.

The other objects and features of this invention will become understood from the following description with reference to the accompanying drawings.

BRIEF DESCRIPTION OF THE DRAWINGS

FIG. 2 is a flowchart showing a processing for a lane deviation preventing control of a first embodiment according to the present invention, which is executed in a vehicle state control unit shown in FIG. 1.

FIGS. 8A and 8B are graphs explaining a setting method of a target driving force employed in a fourth embodiment according to the present invention.

DETAILED DESCRIPTION OF THE INVENTION

Hereinafter, there are discussed embodiments of a lane deviation avoidance system according to the present invention with reference to the drawings.

Figure 1:
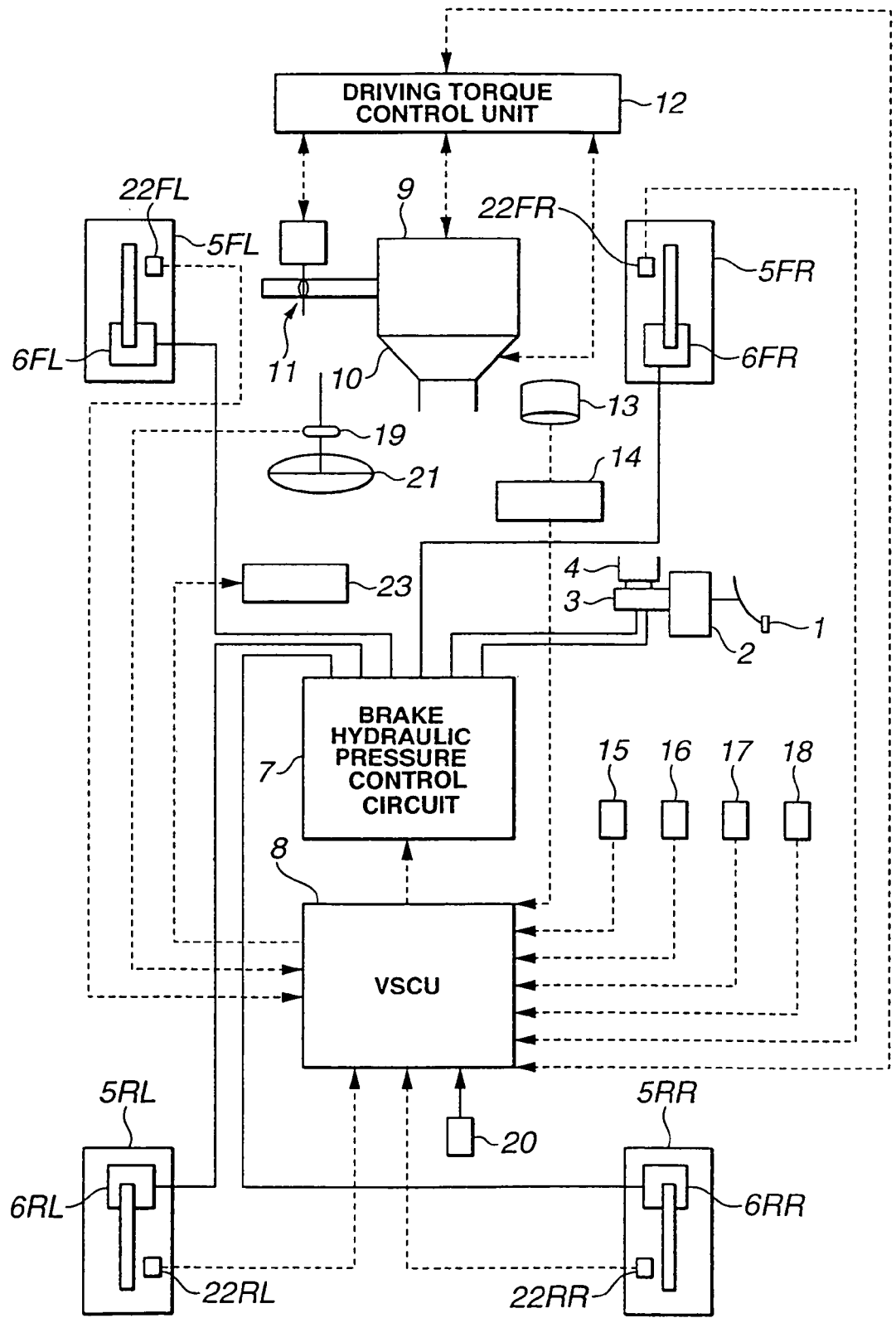
FIG. 1 is a schematic structural view showing a host vehicle equipped with a lane deviation avoidance system according to the present invention.

Referring to FIG. 1, there is shown a host vehicle equipped with the lane deviation avoidance system of a first embodiment according to the present invention. The host vehicle is a rear-wheel drive vehicle on which an automatic transmission 10 and a conventional differential are mounted. A braking force control system of the host vehicle is capable of independently controlling a braking force of each of four wheels.

As shown in FIG. 1, the braking force control system comprises a brake pedal 1, a brake booster 2, a master cylinder 3, and a brake fluid reservoir 4. The braking force control is arranged to supply a brake hydraulic pressure boosted by master cylinder 3 according to a depression quantity of brake pedal 1 caused by the depressing operation of a driver normally. Further, the braking force control system is provided with a braking hydraulic pressure control circuit 7 between master cylinder 3 and each of wheel cylinders 6FL, 6FR, 6RL and 6RRl so as to be capable of independently controlling a brake hydraulic pressure of each wheel cylinder 6FL, 6FR, 6RL, 6RR.

Brake hydraulic pressure control circuit 7 is, for examples, a brake hydraulic pressure control circuit for an anti-skid control and/or a traction control. In this embodiment, brake hydraulic pressure control circuit 7 controls the brake hydraulic pressure of each wheel cylinder 6FL, 6FR, 6RL, 6RR according to a brake hydraulic pressure command value set outputted from a vehicle state control unit (VSCU) 8.

The host vehicle further comprises a driving torque control unit 12 which controls a driving torque to be generated at rear wheels 5RL and 5RR through the control of an operating condition of an internal combustion engine 9, a selected gear ratio of automatic transmission 10, and a throttle opening (accelerator opening) of a throttle opening. The operating condition of engine 9 is controlled by controlling a fuel injection quantity and an ignition time, and is simultaneously controlled by controlling the throttle valve.

Driving force control unit 12 is capable of independently controlling the driving toque of rear wheels 5RL and 5RR of driving wheels, and is further capable of controlling the driving torque according to a driving torque command value when driving torque control unit 12 receives the driving torque command signal from VSCU 8.

The host vehicle further comprises a forward-view recognizing sensor for detecting a position of the host vehicle in a traveling lane to enable the determination as to a lane deviation state of the host vehicle relative to the traveling lane. A single lens camera 11 and a camera controller 14 is installed in the host vehicle as a forward-view recognizing sensor. Camera controller 14 detects lane markers such as white lines of the traveling lane from a picture image of the forward view ahead of the host vehicle taken by camera 13. Further, camera controller 14 calculates a yaw angle $\theta$ of the host vehicle relative to the traveling lane which corresponds to the direction of the host vehicle relative to the traveling lane, a lateral displacement X of the host vehicle relative to a center of the traveling lane, and a curvature $\beta$ of the traveling lane.

Camera controller 14 executes a traveling lane detecting processing using a traveling lane detecting area for detecting lane markers and obtains various data as to the detected traveling lane. Such a traveling lane detecting processing may be executed using a method disclosed in Japanese Published Patent Application No. 11-296660.

More specifically, camera controller 14 detects lane markers such as white lines extending along a traveling lane of the host vehicle and recognizes the traveling lane on the basis of the information as to the lane markers. Since detecting the lane markers such as white lines from a whole area of the image picture largely increases the calculation load and the processing period, this method is arranged to scan a limited area which has a high possibility of the existence of the lane markers, and scan a further smaller area so-called a window. Since the position of the lane markers shown in the picture image is generally changed according to the proceeding direction of the host vehicle, the detection area of scanning the lane markers is set while estimating the proceeding direction of the host vehicle relative to the traveling lane so that the detection area corresponds to an area where the lane markers in the image picture are shown.

Camera controller 14 selects a straight line component which is most likely to be a boundary between the lane marker and a road surface in each lane marker detecting window, and obtains a candidate point of the select straight line component in each window as a representative part of the lane marker. Further, camera controller 14 obtains the lane makers by connecting the candidate points of the continuous windows so as to determine the traveling lane extending ahead of the host vehicle.

Further, the host vehicle is equipped with an accelerator sensor 15 of detecting a longitudinal acceleration Xg and a lateral acceleration Yg generated in the host vehicle, a yaw rate sensor 16 of detecting yaw rate $\phi$ generated in the host vehicle, a master cylinder pressure sensor 18 of detecting a master cylinder pressure Pm which is an output pressure of master cylinder 3, an accelerator opening sensor 18 of detecting an accelerator opening Acc corresponding to a depression quantity of the accelerator pedal, a steering angle sensor 19 of detecting a steering angle of a steering wheel 21, wheel speed sensors 22FL, 22FR, 22RL and 22RR of respectively detecting wheel speeds $Vw_{FL}$, $Vw_{FR}$, $Vw_{RL}$ and $Vw_{RR}$ of wheels 5FL, 5FR, 5RL and 5RR, a turn indicator switch 20 of detecting a turning direction indicating operation through a turn indicator. Vehicle speed control unit (VSCU) 8 receives these signals of the above-discussed sensors.

Further, VSCU 8 receives yaw angle θ of the host vehicle relative to the traveling lane, lateral displacement X of the host vehicle relative to a center of the traveling lane, curvature β of the traveling lane, which are detected by camera controller 14, and a driving torque Tw on a wheel axle, which is controlled by driving toque control unit 12. When the detected traveling condition indicative data includes information as to the direction of left or right side, the left side is defined as a right direction. That is, when the host vehicle turns left, each of yaw rate φ, lateral acceleration Yg, steering angle δ and yaw angle θ has a positive value. Further, when the host vehicle deviates from the center of the traveling lane toward the left hand side, lateral displacement X has a positive value.

An alarm monitor 23 is provided in the vicinity of a driver's seat and informs the lane deviation state to the driver when VSCU 8 detects the lane deviation of the host vehicle. Alarm monitor 23 has a speaker for generating voice and buzzer sounds and output alarm indicative of the lane deviation state to the driver in the form of visual information and sound information.

Subsequently, there is explained a procedure of a calculation processing executed by VSCU 8 with reference to a flowchart shown in FIG. 2. This processing is a time interruption processing executed at predetermined sampling intervals ΔT. Although the flowchart of FIG. 2 does not include steps for communications with other systems and devices, information obtained by this processing is updated and stored in a storage device as occasion arises, and necessary information is read from the storage device as occasion arises.

At step S1 in FIG. 2, vehicle state control unit (VSCU) 8 reads data sent from various sensors, controllers and control units. More specifically, VSCU 8 reads acceleration Xg, lateral acceleration Yg, yaw rate φ, each wheel speed Vwi (i=FL, FR, RL, RR), accelerator opening Acc, master cylinder pressure Pm, steering angle δ, a turn signal, yaw angle θ of host vehicle relative to a traveling lane which is detected by a camera controller 14, lateral displacement X of the host vehicle relative to the center of the traveling lane, curvature β of the traveling lane and a driving torque Tw sent from driving torque control unit 12. Further, VSCU 8 calculates a driver demanded driving force τm (hereinafter calling as a demanded driving force) according to accelerator opening Acc.

At step S2, VSCU 8 calculates an estimated lateral displacement Xs taken in feature as a deviation estimate. More specifically, VSCU 8 calculates estimated lateral displacement Xs using yaw angle θ, lateral displacement X, curvature β and driving torque Tw from the following expression (1).

$$Xs = Tt \times v \times (\theta + Tt \times v \times \beta) + x \quad (1)$$

In the expression (1), Tt is a headway time for calculating a forward observed point, and therefore a forward-observed-distance is obtained by multiply headway time Tt by vehicle speed V. That is, a lateral displacement X relative to the center of the traveling lane at a moment when headway time Tt elapsed from the present time is the estimated lateral displacement Xs. In this first embodiment, it is determined that there is a possibility or lane deviation tendency that the host vehicle deviates from the traveling lane when estimated future lateral displacement Xs becomes greater than or equal to a predetermined lateral-displacement limit value.

Vehicle speed V of the host vehicle is obtained from an average of front left-and-right wheel speeds $Vw_{FL}$ and $Vw_{FR}$ of driven wheels 5FL and 5FR. Although the calculation of vehicle speed V has been explained such that vehicle speed V is calculated on the basis of front left-and-right wheel speeds $Vw_{FL}$ and $Vw_{FR}$, it is not limited to this. For example, when the host vehicle is equipped with an ABS control system of executing a known anti-skid control and the ABS control system is executing the anti-skid control, an estimated vehicle-body speed estimated during the processing of the anti-skid control may be used as vehicle speed V.

At step S3 VSCU 8 determines whether or not the vehicle is put in the deviation tendency from the traveling lane. This determination is made by comparing estimated lateral displacement Xs obtained at step S2 as a lane deviation estimated value and a deviation determination threshold Xc. More specifically, when estimated lateral displacement Xs is greater than or equal to deviation determination threshold Xc (Xs≧Xc), it is determined that the host vehicle will deviate from the traveling lane toward the left hand side and a deviation determination flag $F_{LD}$ is set at ON. When Xs≦−Xc, it is determined that the host vehicle will deviate from the traveling lane toward the right hand side and deviation determination flag $F_{LD}$ is set at OFF. When neither of Xs≧Xc nor Xs≦−Xc is satisfied, it is determined that the vehicle will not deviate from the traveling lane, and deviation determination flag $F_{LD}$ is set at OFF.

Herein, deviation determination threshold Xc is a constant, and may be set, for example, at a smaller one of a value obtained by subtracting a half of a width L0 of the host vehicle from a half of a width L of a traveling lane and 0.8 meter. The width L of the traveling lane may be set at a fixed value such as a lane width of a highway, which is normally set at 3.35 meter in Japan. Further, the width L may be varied according to an actual traveling road by obtaining information as to the lane width from a position of the host vehicle and map data which are of information of a navigation system. Furthermore, if it is possible to obtain a distance (L/2-Xs) between the host vehicle and a lane defining line (lane marker) of a deviating side through a communication between the host vehicle and an infrastructure system including signal outputting markers, such information may be employed for determining the lane deviation tendency.

In the first embodiment, the determination as to the lane deviation of the host vehicle is executed on the basis of the deviation determination threshold Xc. Additionally, by determining whether or not the driver intends to execute a lane change, the lane deviation determination may be executed upon taking account of the lane change intent of the driver. More specifically, when it is determined based on the signal of turn indicator switch 20 that the driver manipulated turn indicator switch 20 and the direction indicated by turn indicator switch 20 corresponds to a deviating direction specified by a sign indicative of positive or negative of estimated lateral displacement Xs, it is determined that a lane change based on the driver's intent is being executed, and lane deviation determination flag $F_{LD}$ is set at OFF. On the other hand, when it is determined that the driver manipulated turn indicator switch 20 and the direction indicated by turn indicator switch 20 does not correspond to a deviating direction specified by a signal indicative of positive or negative of estimated lateral displacement Xs, it is determined that there is a possibility of the lane deviation, and therefore lane deviation determination flag $F_{LD}$ is not changed. Further, even when turn signal indicator switch 20 is not manipulated and if it is determined based on steering angle δ outputted from steering angle sensor 19 that the driver steers the vehicle toward the lane deviating direction and steering angle δ is greater than a previously obtained threshold, it is determined that there is a driver's intent of executing a lane change, and therefore lane deviation determination flag $F_{LD}$ is changed to OFF.

At step S4 subsequent to the execution of step S3, VSCU 8 calculates a target driving force. Herein, VSCU 8 calculates a pseudo-accelerator-opening As which is an accelerator opening corresponding to a final target driving force. More specifically, the pseudo-accelerator-opening As is calculated on the basis of accelerator opening Acc read at step S1 according to deviation determination flag $F_{LD}$ set at step S3.

Figure 3A:
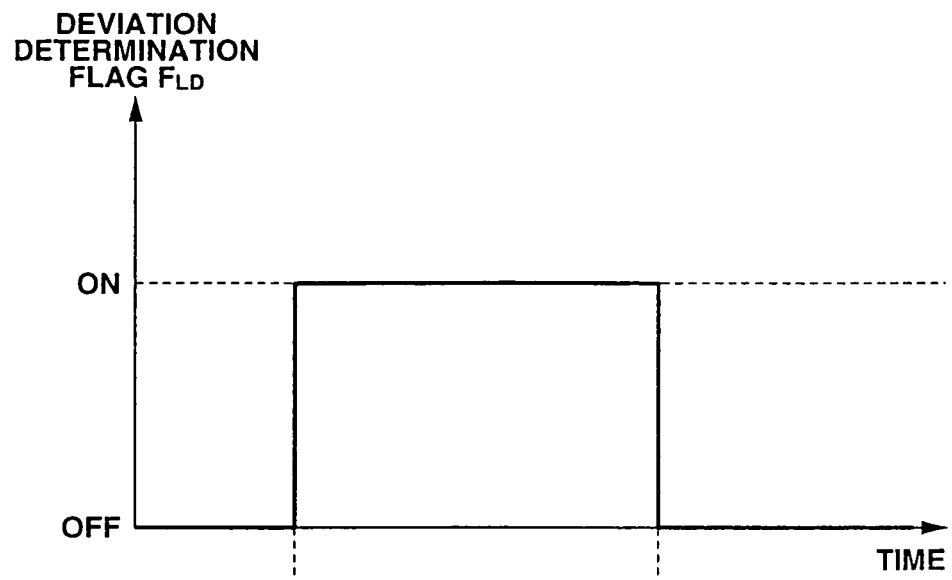
FIGS. 3A and 3B are maps employed in the processing shown in FIG. 2.
Figure 3B:
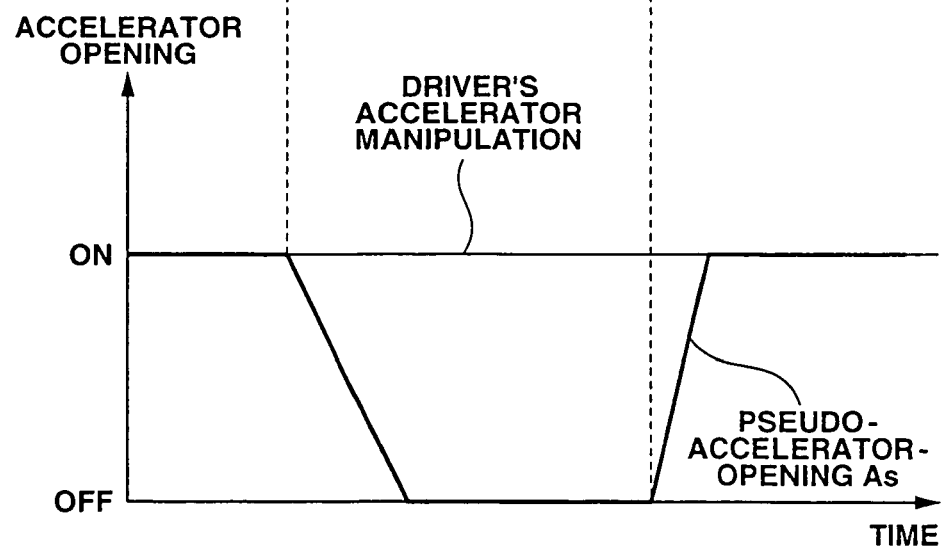

As shown in FIGS. 3A and 3B, when deviation determination flag $F_{LD}$ is set at ON, accelerator opening Acc taken at a moment when lane deviation determination flag $F_{LD}$ is changed from OFF to ON is set as an initial value $A_0$, and pseudo-accelerator-opening As is set at a value which gradually decreases from initial value $A_0$ to zero. When lane deviation determination flag $F_{LD}$ is changed from ON to OFF, pseudo-accelerator-opening As is set at a value which gradually increases from pseudo-accelerator opening Acc taken at a moment that deviation determination flag $F_{LD}$ is changed from ON to OFF to a value corresponding with accelerator opening Acc. Thereafter, when pseudo-accelerator-opening As corresponds with accelerator opening Acc, pseudo-accelerator-opening As is set at sequentially read accelerator opening Acc. That is, when it is determined that the host vehicle does not deviate the traveling lane, target driving force is set at the driving force according to accelerator opening Acc. When it is determined that the host vehicle deviates the lane deviation, pseudo-accelerator-opening As is set so as to gradually decrease the target driving force to zero.

Figure 4:
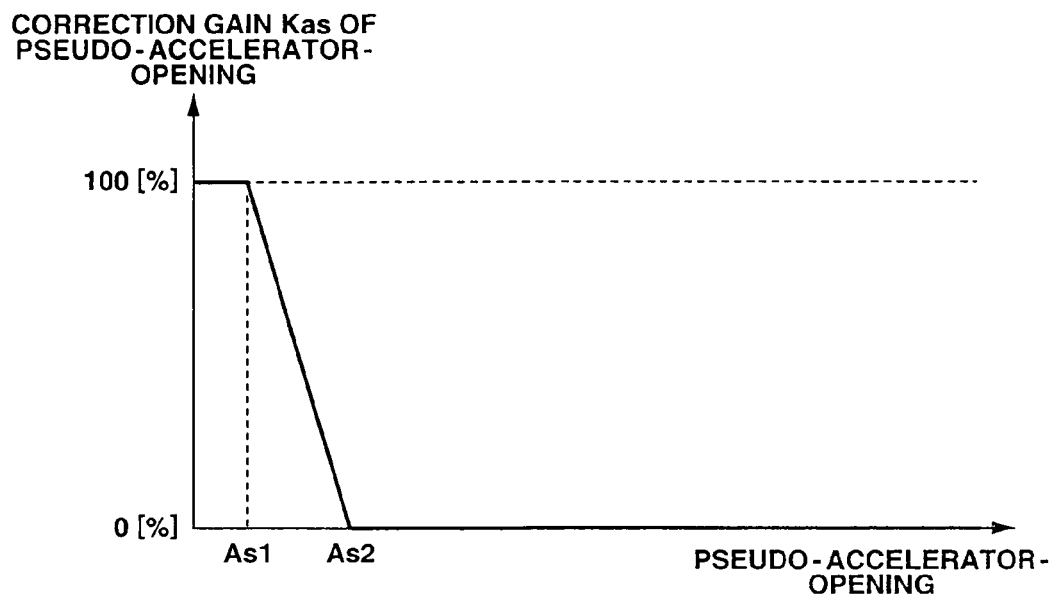
FIG. 4 is a map employed in the processing shown in FIG. 2.

The program then proceeds to step S5 after pseudo-accelerator-opening As is calculated and the target driving force is specified. At step S5 VSCU 8 calculates a target yawing moment Ms to be generated in the host vehicle to suppress the lane deviation. When deviation determination flag $F_{LD}$ is set at OFF, target yawing moment Ms is set at zero (Ms=0). When deviation determination flag $F_{LD}$ is set at ON, target yawing moment Ms is calculated on the basis of a difference between estimated lateral displacement Xs calculated at step S2 and deviation threshold Xc. The difference corresponds to a lane deviation quantity. When $Xs \geq Xc$, target yawing moment Ms is obtained using the following expression (2). When $Xs \geq -Xc$, target yawing moment Ms is obtained using the following expression (3).

$$Ms = -K1 \times K2 \times Kas \times (Xs-Xc) \quad (2)$$

$$Ms = -K1 \times K2 \times Kas \times (Xs+Xc) \quad (3)$$

where a yawing moment having a direction of anti-clockwise has a positive value, K1 is a proportional coefficient determined from specifications of the vehicle, K2 is a proportional coefficient, Kas is a correction gain set according to pseudo-accelerator-opening As calculated at step S4 and is, for example, as shown in FIG. 4. In FIG. 4, a horizontal axis denotes a pseudo-accelerator-opening As which corresponds to the target driving force calculated at step S4, and a vertical axis denotes a correction gain Kas which is set so as to avoid the interference between a driving force generated by the manipulation of the accelerator pedal and a braking force for avoiding the lane deviation.

As shown in FIG. 4, when pseudo-accelerator-opening As is smaller than or equal to a first threshold As1, correction gain Kas is set at 100%. Correction gain Kas decreases as pseudo-accelerator-opening As increases. More specifically, correction gain Kas is in inverse proportion to pseudo-accelerator-opening As. When pseudo-accelerator-opening As is greater than or equal to a second threshold As2 which is greater than first threshold As1, correction gain Kas is set at 0%. Accordingly, when pseudo-accelerator-opening As is small, that is, when it is determined that there is the lane deviation tendency or when the driver's accelerator manipulation quantity is small, correction gain Kas is set so as to generate a yawing moment for certainly avoiding the lane deviation. On the other hand, when pseudo-accelerator-opening As is large, that is, when it is determined that there is no lane deviation tendency, it is unnecessary to generate a yawing moment. Therefore, correction gain Kas is set so as to decrease target yawing moment Ms. More specifically, target yawing moment Ms is gradually decreased by decreasing correction gain Kas in reverse proportion to the increase of pseudo-accelerator-opening As when pseudo-accelerator-opening As is in a range between first threshold As1 and second threshold As2. This setting limits the fluctuation quantity of the yawing moment to be applied to the vehicle and thereby suppressing a radical change of the vehicle behavior.

At step S6 subsequent to the execution of step S5, VSCU 8 calculates the target braking force. More specifically, a target brake hydraulic pressure Psi for each wheel is calculated on the basis of master cylinder pressure Pm read at step S1 and target yawing moment Ms calculated at step S5. When a rear wheel master cylinder pressure is set at $Pm_R$ according to master cylinder pressure Pm and a braking force distribution among the front and rear wheels and when lane deviation determination flag $F_{LD}$ is set at OFF, target brake hydraulic pressures $Ps_{FR}$ and $Ps_{FL}$ supplied to wheel cylinders 6FL and 6FR of front left and right wheels 5FL and 5FR are set at master cylinder pressure Pm and target brake hydraulic pressures $Ps_{RR}$ and $Ps_{RL}$ supplied to wheel cylinders 6RL and 6RR of rear left and right wheels 5RL and 5RR are set at rear wheel master cylinder $Pm_R$.

On the other hand, when the rear wheel master cylinder pressure is set at $Pm_R$ according to master cylinder pressure Pm and a braking force distribution among the front and rear wheels and when deviation determination flag $F_{LD}$ is set at ON, wheel cylinder pressures of front and rear wheel cylinders 5FR, 5FL, 6RR and 6RL are determined according to the magnitude of target yawing moment Ms case by case. More specifically, when an absolute value |Ms| of target yawing moment Ms is smaller than a predetermined value Ms0, the braking forces between rear left and right wheels are differentiated only. When the absolute value |Ms| of target yawing moment Ms is greater than or equal to predetermined value Ms0, the braking forces between front left and right wheels are also differentiated in addition to the differentiating between rear left and right wheels. Accordingly, when the absolute value |Ms| of target yawing moment Ms is smaller than predetermined value Ms0, a front left-and-right wheel hydraulic difference $\Delta Ps_F$ is set at zero ($\Delta Ps_F$=0) and a rear left-and-right wheel hydraulic pressure difference $\Delta Ps_R$ is obtained from the following expression (4). In the expression (4), T denotes a tread between front wheels and a tread between rear wheels, KbF and KbR respectively denote conversion coefficients for converting the braking force into the brake hydraulic pressure and are determined based on the specifications of the brake system.

$$\Delta Ps_R = 2 \times KbR \times |Ms|/T \quad (4)$$

When the absolute value |Ms| of target yawing moment Ms is greater than or equal to predetermined value Ms0, a front left-and-right wheel target brake hydraulic difference $\Delta Ps_F$ is obtained from the following expression (5), and a rear left-and-right wheel target brake hydraulic difference $\Delta Ps_F$ is obtained from the following expression (6)

$$\Delta Ps_F = 2 \times KbR \times (|Ms|-Ms0)/T \quad (5)$$

$$\Delta Ps_R = 2 \times KbR \times Ms0/T \quad (6)$$

Although there has been explained such that the braking forces of the front and rear wheels are respectively controlled, the invention is not limited to this, and only the braking force of the front wheels may be controlled. In case that the braking force of the front wheels is controlled, front left-and-right wheel target brake hydraulic difference may be obtained from the expression $\Delta Ps_F = 2 \times KbF \times |Ms|/T$.

Accordingly, when target yawing moment Ms has a negative value, that is, when the host vehicle will deviate from the traveling lane toward the left hand side, target brake hydraulic pressures Psi to each wheel cylinder 6FR, 6FL, 6RR, 6RL is obtained from the following expressions (8).

$$Ps_{FL} = Pm$$

$$Ps_{FR} = Pm + \Delta Ps_F$$

$$Ps_{RL} = Pm_R$$

$$Ps_{RR} = Pm_R + \Delta Ps_R \qquad (7)$$

When target yawing moment Ms has (takes on) a positive value, that is, when the host vehicle will deviate from the traveling lane toward the right hand side, target brake hydraulic pressures Psi to each wheel cylinder 6FR, 6FL, 6RR, 6RL is obtained from the following expressions (8).

$$Ps_{FL} = Pm + \Delta Ps_F$$

$$Ps_{FR} = Pm$$

$$Ps_{RL} = Pm_R + \Delta Ps_R$$

$$Ps_{RR} = PmR \qquad (8)$$

At step S7 subsequent to the execution of step S6, VSCU 8 outputs a control signal to driving torque control unit 12 to generate the target driving force according to pseudo-accelerator-opening As calculated at step S4. As shown in FIGS. 3A and 3B, when lane deviation determination flag $F_{LD}$ is set at OFF and there is no lane deviation tendency, the driving force is generated according to accelerator opening Acc. When lane deviation determination flag $F_{LD}$ is set at ON, a driving force smaller than the driving force according to accelerator opening Acc is generated.

At step S8 VSCU 8 outputs signals indicative of the target brake hydraulic pressures for the respective wheels, which calculated at step S6, to brake hydraulic pressure control circuit 7. When deviation determination flag FLD is set at ON, VSCU 8 executes an alarm processing of informing that the host vehicle is put in the lane deviation tendency, by operating an alarm monitor 23.

Subsequently there is discussed a manner of operation of the lane deviation avoidance system of the first embodiment according to the present invention.

When the host vehicle travels on a center of the traveling lane, estimated lateral displacement Xs calculated at step S2 satisfies neither $Xc \geq Xc$ nor $Xs \leq -Xc$, and therefore lane deviation determination flag $F_{LD}$ is set at OFF by the execution of step S3. Accordingly, target yawing moment Ms is set at zero (Ms=0), and the yawing moment for lane avoidance is not generated since $F_{LD}$=OFF. Further, when lane deviation determination flag $F_{LD}$ is set at OFF, pseudo-accelerator-opening As is set at accelerator opening Acc according to a depression quantity of an accelerator pedal depressed by the driver. Accordingly, the target driving force according to the accelerator manipulation quantity manipulated by the driver is generated. During this period no yawing moment is generated, and therefore the host vehicle performs a vehicle behavior according to the driver's manipulation.

When the host vehicle is put in the lane deviation tendency of deviating from the traveling lane toward the left hand side so as to increase estimated lateral displacement Xs from the non deviation state and estimated lateral displacement Xs becomes greater than or equal to lane deviation determination threshold Xc ($Xs \geq Xc$), lane deviation determination flag $F_{LD}$ is set at ON. Therefore, as shown in FIGS. 3A and 3B, accelerator opening Acc at this moment is set as an initial value $A_0$, and pseudo-accelerator-opening As is set at a value which gradually decreases from initial value $A_0$. Thereafter pseudo-accelerator-opening As reaches zero (As=0). Correction gain Kas gradually increases from 0% and reaches 100% according to the decrease of pseudo-accelerator-opening As, as shown in FIG. 4.

Thus, the driving force according to pseudo-accelerator-opening As is generated, and target yawing moment Ms is calculated according to correction gain Kas. When it is determined that the host vehicle is put in the lane deviation tendency, the driving force to be generated is gradually decreased and reaches zero relative to the manipulation quantity of the accelerator pedal. On the other hand, the braking force control is executed such that target yawing moment Ms gradually increases as the driving force decreases, and becomes target yawing moment Ms according to the lane deviation quantity.

When it is determined that the host vehicle is put in the lane deviation tendency and the braking force is generated to generate target yawing moment Ms for avoiding the lane deviation, the driving force is decreased even when the accelerator pedal is depressed. Accordingly, no interference causes between the driving force according to the accelerator pedal manipulation and the braking force for avoiding the lane deviation. This enables the yawing moment for avoiding the lane deviation to be sufficiently generated. Therefore, the lane deviation avoidance system according to the first embodiment of the present invention sufficiently ensures the advantages of the lane deviation avoiding control.

During this period, the driving force is gradually decreased and the yawing moment is gradually generated. Therefore it becomes possible to avoid the lane deviation and to ensure the driving force. When the deviation tendency is prevented by generating target yawing moment Ms or executing the steering manipulation, that is, when lane deviation determination flag $F_{LD}$ is changed to OFF, pseudo-accelerator-opening As is gradually increased so as to correspond with sequentially updated accelerator opening Acc. Therefore, when lane deviation determination flag $F_{LD}$ is changed to OFF, target yawing moment Ms gradually decreases, then reaches zero according to this change of deviation determination flag $F_{LD}$. The driving force actually generated in response to the target manipulation quantity of the accelerator pedal is gradually recovered, and at last the driving force according to the manipulation quantity of the accelerator pedal is generated.

Thus, when a yawing moment is generated under the lane deviation tendency of the host vehicle, target yawing moment Ms is ensured by decreasing the driving force without generating the driving force according to the manipulation quantity of the accelerator pedal. Therefore, it becomes possible to avoid the interference between the braking force for generating target yawing moment Ms and the driving force and to sufficiently ensure the control effect of the lane deviation avoidance control.

That is, when it is determined that there is the lane deviation tendency, the driving force according to the manipulation quantity of the accelerator pedal is gradually decreased and target yawing moment is gradually increased. When the lane deviation tendency is solved, the driving force is gradually increased and target yawing moment Ms is gradually decreased. Accordingly, it becomes possible to avoid the driver from having a strange feeling from the large changes of the driving force and/or the braking force. Further, when the generation of the yawing moment is started, the driving force is ensured and the yawing moment is generated. When the generation of the yawing moment is terminated, the yawing moment is ensured and the driving force is recovered. Further, the interference between the driving force an the braking force is prevented.

When pseudo-accelerator-opening As is increased to accelerator opening Acc in response to the change of lane deviation determination flag $F_{LD}$ to OFF, by quickly varying pseudo-accelerator-opening As, more specifically by suppressing the generation of the yawing moment through quickly recovering the driving force when the lane deviation tendency is solved, it becomes possible to avoid the operation of the yawing moment under the deviation recovered condition. Further, by slowly decreasing pseudo-accelerator-opening at an initial period of the lane deviation, for example, it becomes possible to avoid the driving force from being excessively decreased when the host vehicle is intentionally and temporally put in the lane deviation tendency. Further, when the host vehicle is recovered from the lane deviation tendency to a normal traveling state, it is possible to quickly recover the driving force.

Although the first embodiment according to the present invention has been shown and described such that pseudo-accelerator-opening As is decreased to zero when it is determined that there is the lane deviation tendency, as shown in FIGS. 3A and 3B, pseudo-accelerator-opening As may not be decreased to zero and may be decreased to an accelerator opening corresponding to a target driving force which does not cause the interference between the braking force of generating the yawing moment for avoiding the lane deviation and the driving force.

In the first embodiment according to the present invention, the processing executed at step S3 in FIG. 2 corresponds to lane deviation detecting means. The processing executed at steps S5, S6 and S8 in FIG. 2 corresponds to lane deviation avoidance control means. Drive torque control unit 12 and engine 9 correspond to driving force generating means. The processing of calculating demanded driving force τm according to accelerator opening Acc obtained at accelerator opening sensor 18 corresponds to driving force demand quantity detecting means. The processing executed at step S2 of FIG. 2 corresponds to deviation quantity estimating means. The processing executed at step S4 where the target driving force is calculated based on pseudo-accelerator-opening As corresponds to driving force suppressing means. The processing executed at step S5 corresponds to target yawing moment calculating means. The processing executed at step S6 corresponds to yawing moment generating means.

Subsequently, there is discussed a second embodiment of the lane deviation avoidance system according to the present invention.

This second embodiment is basically the same as the first embodiment except that the processing executed by vehicle-state control unit (VSCU) 8 is different from that in the first embodiment. Therefore, the explanation of the same parts is omitted herein. In this second embodiment, VSCU 8 executes a calculation processing as shown by a flowchart of FIG. 5.

Figure 5:
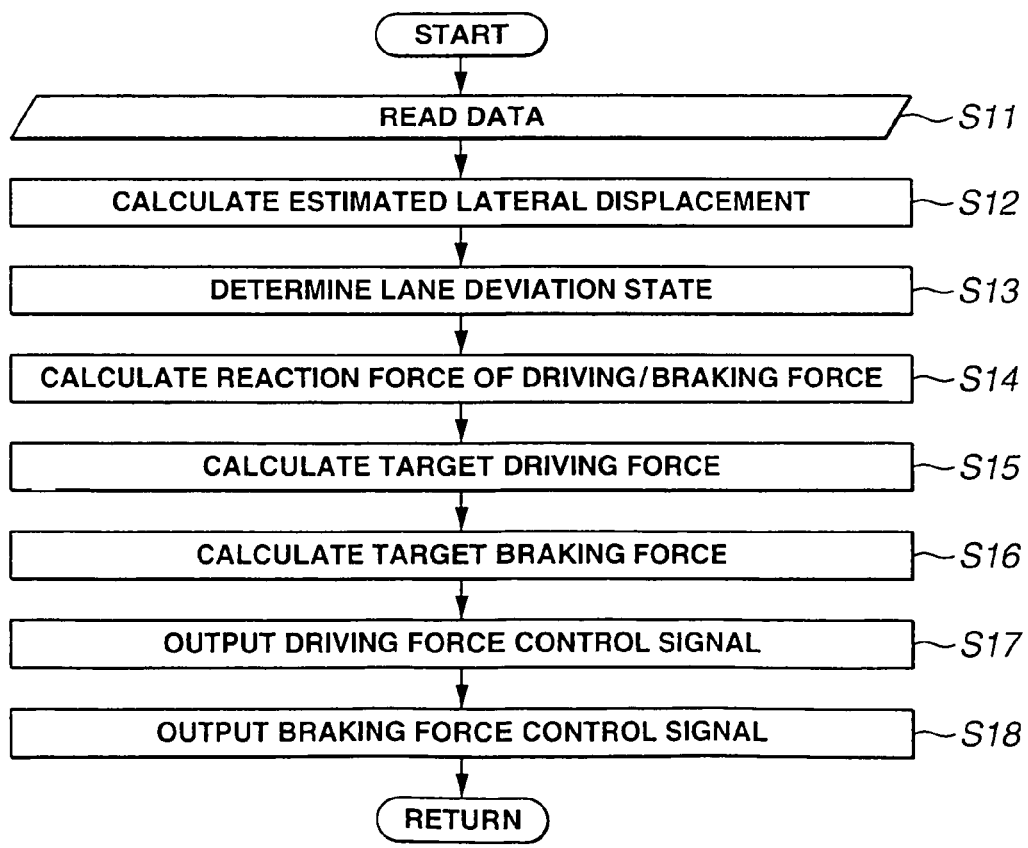
FIG. 5 is a flowchart showing a processing executed in a second embodiment according to the present invention.

At step S11 in the processing in FIG. 5, vehicle-state control unit (VSCU) 8 reads data from various sensors, controllers and control units as is similar to the execution at step S1 in FIG. 2 and calculates demanded driving force τm according to accelerator opening Acc.

At step S12, VSCU 8 calculates an estimated future lateral displacement Xs as a deviation estimate as is similar to the execution at step S2 of the first embodiment. Subsequently at step S13 VSCU 8 determines the lane deviation state.

At step S14 VSCU 8 calculates a driving/braking-force reaction force τc which corresponds to an estimated reaction force reacting against a driving force generated according to demanded driving force τm when a braking force necessary for obtaining a deceleration quantity of avoiding the lane deviation. More specifically, when lane deviation determination flag $F_{LD}$ is set at OFF, driving/braking-force reaction force τc is set at zero (τc=0). When lane deviation determination flag $F_{LD}$ is set at OFF, driving/braking-force reaction force τc is set according to a difference between estimated lateral displacement Xs and lane deviation determination threshold Xc. That is, when XS≧Xc, driving/braking-force reaction force τc is calculated using the following expression (9). When Xs≦Xc, driving/braking-force reaction force τc is calculated using the following expression (10).

$$\tau c = K11 \times K12 \times |Xs-Xc| \quad (9)$$

$$\tau c = K11 \times K12 \times |Xs+Xc| \quad (10)$$

where K11 is a proportional coefficient determined from specifications of the host vehicle and K12 is a proportional coefficient according to the change of the vehicle speed such that K12 decreases as the vehicle speed increases.

At step S15 VSCU 8 calculates a target driving force τs on the basis of demanded driving force τm calculated at step S11 and driving/braking-force reaction force τc calculated at step S14. More specifically, when driving/braking-force reaction force τc is achieved by limiting demanded driving force τm within a range greater than zero and by generating the engine braking force, target driving force τs is calculated by subtracting driving/braking-force reaction force τc from demanded driving force τm. When driving/braking-force reaction force τc is greater than the achievable range, target driving force τs is first limited by a force corresponding to the engine braking force and a shortage of the limitation is achieved by controlling the braking force.

That is, when lane deviation determination flag $F_{LD}$ is set at OFF, it is not necessary to limit the driving force. Therefore, target driving force τs is set at demanded driving force τm according to accelerator opening Acc. When lane deviation determination flag $F_{LD}$ is set at ON, target driving force τs is determined according to the vehicle operating state. More specifically, when driving/braking-force reaction force τc satisfies a condition of τc≦τm+τe, target driving force τs is calculated using the following expression (11). When driving/braking-force reaction force τc satisfies a condition of τc>τm+τe, target driving force τs is calculated using the following expression (12).

$$\tau s = \tau m - \tau c \quad (11)$$

$$\tau s = -\tau e \quad (12)$$

where τe is an absolute value of a generable engine braking force generable at this moment and is calculated on the basis of the operating state of the engine, a state of the automatic transmission and the throttle opening at this moment.

At step S16 VSCU 8 calculates a target braking force τb. More specifically, target braking force τb is set at a force corresponding to a shortage of the driving/braking-force reaction force τc (calculated at step S14) generated even if the limitation of the driving force is executed at step S16. That is, when lane deviation determination flag $F_{LD}$ is set at ON and driving/braking-force reaction force τc is smaller than or equal to a value τm+τe (τc≦τm+τe), target braking force τb is set at zero (τb=0). When lane deviation determination flag $F_{LD}$ is set at ON and driving/braking-force reaction force τc is greater than the value τm+τe (τc>τm+τe), target braking force τb is calculated using the following expression (13).

$$\tau b = \tau c - (\tau m + \tau e) \quad (13)$$

That is, target brake hydraulic pressure Psi for each wheel is calculated on the basis of target braking force τb and master cylinder pressure Pm read at step S11. As is similar to the first embodiment, in case that rear-wheel master cylinder pressure is set at $Pm_R$ based on the front and rear braking force distribution relative to master cylinder pressure Pm read at step S11, when lane deviation determination flag $F_{LD}$ is set at OFF, target brake hydraulic pressures $Ps_{FL}$ and $Ps_{FR}$ for wheel cylinders 6FL and 6FR of front left and right wheels 5FL and 5FR are both set at master cylinder pressure Pm, and target brake hydraulic pressures $Ps_{RL}$ and $Ps_{RR}$ for wheel cylinders 6RL and 6RR of rear left and right wheels 5RL and 5RR are set at rear-wheel master cylinder pressure $Pm_R$.

On the other hand, when lane deviation determination flag $F_{LD}$ is set at ON, target brake hydraulic pressure Psi to each wheel cylinder 6FL, 6FR, 6RL, 6RR is obtained from the following expressions (14).

$$Ps_{FL} = Pm + KbF \times \tau b$$

$$Ps_{FR} = Pm + KbF \times \tau b$$

$$Ps_{RL} = Pm_R + KbR \times \tau b$$

$$Ps_{RR} = Pm_R + KbR \times \tau b \quad (14)$$

Although the explanation has been made such that target brake hydraulic pressure Ps of each wheel is a sum of the brake hydraulic pressure converted from target braking force τb and master cylinder pressure Pm, it is not limited to this and a larger one of target brake hydraulic pressure Ps and master cylinder pressure Pm may be selected as target brake hydraulic pressure Ps.

After the calculation of the target braking force in this manner, the program proceeds to step S17 wherein VSCU 8 outputs a driving force control signal to driving torque control unit 12 so as to generate target driving force τb calculated at step S15.

At step S18 VSCU 8 outputs the target brake hydraulic pressure of each wheel to brake hydraulic pressure control circuit 7. When lane deviation determination flag $F_{LD}$ is set at ON, a processing of operating an alarm monitor 23. Thereafter, the routine returns to a main program.

Subsequently, there is discussed the manner of operation of the second embodiment according to the present invention.

In the second embodiment, when the host vehicle is not put in the lane deviation tendency, the lane deviation determination flag $F_{LD}$ is set at OFF. Therefore, driving/braking-force reaction force τc is set at zero (τc=0) by the execution of step S14. Target driving force τs is set at demanded driving force τm (τs=τm) by the execution of step S16. Target braking force τb is set at zero (τb=0) by the execution of step S16. Accordingly, a deceleration for avoiding the lane deviation is not executed. By generating demanded driving force τm according to the manipulation quantity of the accelerator pedal, the host vehicle is put in the traveling state adapted to the driver's manipulation.

When the host vehicle is put in the lane deviation tendency and therefore lane deviation determination flag $F_{LD}$ is changed to ON from OFF, driving/braking-force reaction force τc is calculated on the basis of the lane deviation quantity (Xs−Xc) at this moment. When driving/braking-force reaction force τc is smaller than or equal to the sum of demanded driving force τm and engine braking force τe, target braking force τs is obtained by subtracting driving/braking-force reaction force τc from demanded driving force τm (τs=τm−τc) and target braking force τb is set at zero (τb=0). Therefore, the braking force and the driving force of the host vehicle are generated based on the obtained target driving force τs and target braking force τb.

Accordingly, even when demanded driving force τm should be naturally generated according to the manipulation of the accelerator pedal, target driving force τs is set at a value obtained by subtracting driving/braking-force reaction force τc corresponding to the deceleration quantity necessary for suppressing the lane deviation quantity of the host vehicle from demanded driving quantity τm. Therefore, the deceleration quantity necessary for avoiding the lane deviation is applied to the host vehicle, and the driving force obtained by subtracting the lane deviation avoiding deceleration quantity from demanded driving quantity τm is generated as a driving force. Therefore, without occurring an interference between the braking force for avoiding the lane deviation and the driving force according to the driver's demand, the deceleration quantity for the lane deviation is ensured and the driving force according to the driver's demand is generated.

When the lane deviation quantity of the host vehicle is large and the manipulation quantity of the accelerator pedal manipulated by the driver is small, that is, when driving/braking-force reaction force τc is larger than the sum of demanded driving force τm and engine braking force τe, target driving force τc is set at engine braking force τe, and target braking force τb is set at a value obtained by subtracting the sum of demanded driving force τm and engine braking force τe from driving/braking force reaction force τc.

That is, when it is incapable of generating a braking force corresponding to driving/braking-force reaction force τc by limiting demanded driving force τm and generating engine braking force τe, the driving force is decreased to a driving force corresponding to the engine braking force τe so as to generate the driving force and the shortage thereof is compensated by the braking force. As a result, it becomes possible to apply the deceleration quantity corresponding to the driving/braking-force reaction force τc to the host vehicle. Since demanded driving force τm is decreased and the shortage thereof is compensated by generating the braking force, it becomes possible to firmly ensure the braking force for avoiding the lane deviation and to generate the driving force within a generable range.

Further, since the second embodiment is arranged to execute the of the lowering of the driving force according to a corresponding force of driving/braking-force reaction force τc according to the lane deviation quantity of the host vehicle and to generate the braking force according to the necessity thereof, it becomes possible to smoothly change the driving force and/or the braking force according to the change of the lane deviation quantity. Further, it becomes possible to quickly recover the driving force according to the recovery of the lane deviation quantity when the lane deviation is recovered.

Although the second embodiment according to the present invention has been explained such that driving/braking-force reaction force τc is calculated, demanded driving force τm is controlled and the deceleration quantity corresponding to driving/braking-force reaction force τc is ensured by compensating the shortage thereof by the barking force, it may be arranged to decrease only demanded driving force τm. In such a case, when demanded driving force τm is small as compared with driving/braking-force reaction force τc, it is impossible to ensure the deceleration quantity corresponding to driving/braking-force reaction force τc. However, it is possible to avoid the interference between demanded driving force τm and the deceleration quantity necessary for avoiding the lane deviation. Therefore, it is possible to obtain the advantage ensured by the control of the lane deviation avoidance although this control does not thoroughly satisfy the desired controls.

In the second embodiment according to the present invention, the processing executed at step S13 in FIG. 5 corresponds to deviation detecting means. The processing executed at steps S14 through S18 corresponds to deviation avoidance control means. Driving torque control unit 12 and engine 9 correspond to driving force generating means. The processing of calculating demanded driving force τm according to the accelerator opening Acc detected by accelerator opening sensor 18 corresponds to driving force demanded quantity detecting means. The processing executed at step S14 corresponds to reaction force detecting means. The processing executed at step S15 corresponds to driving force suppressing means. The processing executed at step S16 corresponds to deceleration controlled quantity calculating means. The processing executed at step S18 corresponds to deceleration controlling means. The processing executed at steps S15 and S16 corresponds to driving/braking force calculating means. The processing executed at steps S17 and 18 corresponds to driving/braking force controlling means.

Subsequently there is discussed a third embodiment of the lane deviation avoidance system according to the present invention.

The third embodiment is different from the first embodiment in the processing procedure of the calculation processing executed by VSCU 8. Further, VSCU 8 of the third embodiment is arranged to receive a driving torque Tw on the wheel axle which is controlled by the driving torque control unit 12 and demanded driving force τm according to an engine torque τa and accelerator opening Acc which are detected by driving torque control unit 12.

Figure 6:
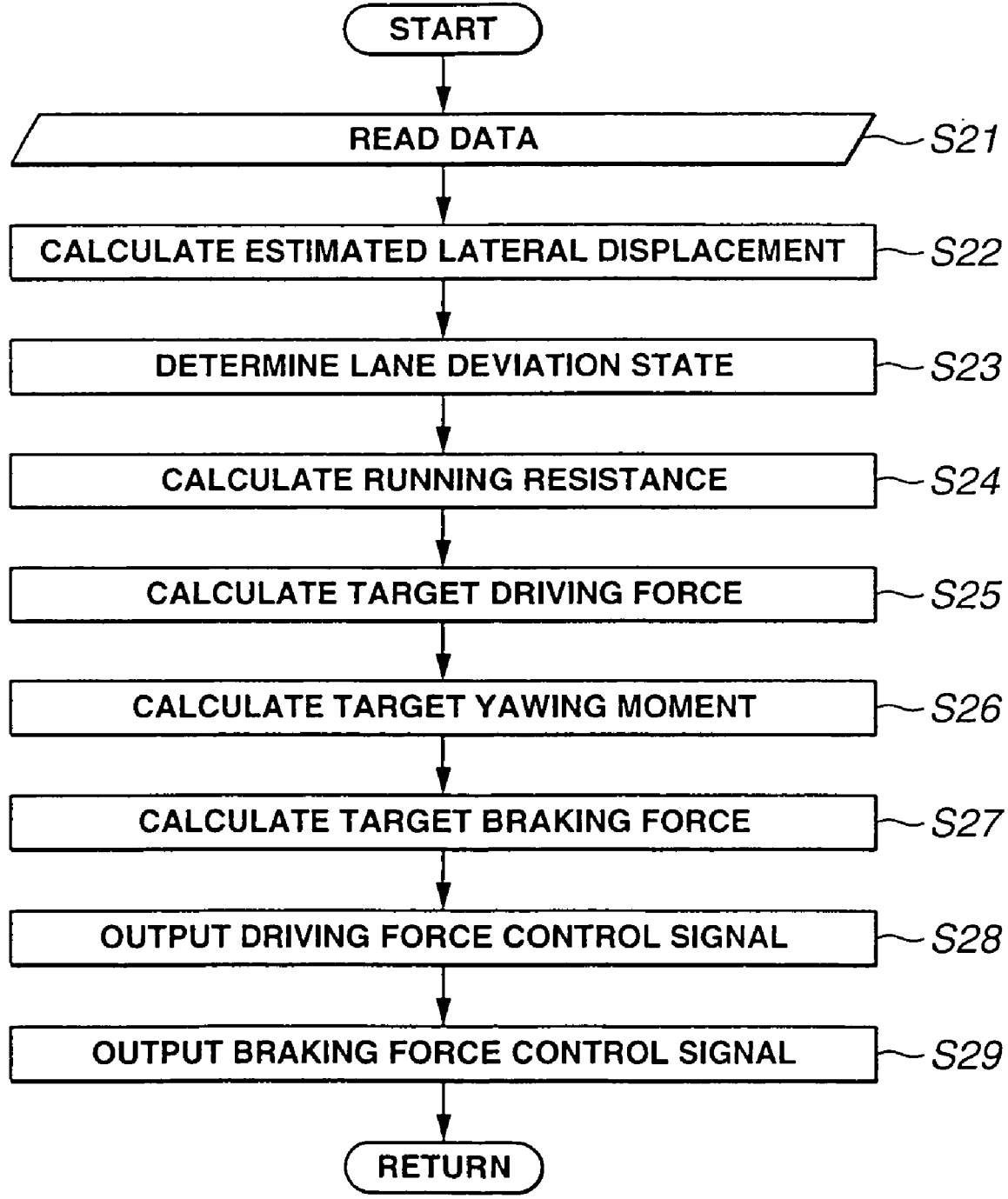
FIG. 6 is a flowchart showing a processing executed in a third embodiment according to the present invention.

FIG. 6 shows a flowchart showing a procedure of the calculation processing executed by VSCU 8 of the third embodiment according to the present invention.

The processing executed at steps S21 through S23 in FIG. 6 is the same as the processing executed at steps S1 through S3 in FIG. 2. That is, at step S21 VSCU 8 reads various data including driving torque Tw, engine torque τa and demanded driving torque τm. At step S22 VSCU 8 calculates estimated lateral displacement Xs. At step S23 VSCU 8 executes the lane deviation determination by comparing estimated lateral displacement Xs and deviation determination threshold Xc.

At step S24 VSCU 8 calculates a running resistance force τr of the host vehicle at a present moment. More specifically, VSCU 8 first calculates an estimated driving force τh of the host vehicle from engine torque τa detected by driving torque control unit 12, using the following expression (15).

$$\tau h = \tau a \times Kg \qquad (15)$$

where Kg is a coefficient of converting engine torque τa into a driving torque at the drive axle and is a torque gear ration determined from the specifications of the host vehicle.

Subsequently, VSCU 8 calculates an actual driving force τv generated by the host vehicle using vehicle speed V and the following expression (16).

$$\tau v = (dV/dt) \times Kt \qquad (16)$$

where Kt is a coefficient for converting the acceleration into the driving force and is determined from the specifications of the host vehicle.

Subsequently, VSCU 8 calculates running resistance force τr from estimated driving force τh calculated by the expression (15) and actual driving force τv calculated by the expression (16), using the following expression (17). Running resistance force τr is a value increasing according to the increase of the running resistance of the host vehicle. That is, running resistance force τt increases as an upslope gradient of a traveling road increases.

$$\tau r = \tau h - \tau v \qquad (17)$$

After the calculation of running resistance force τr, the routine proceeds to step S25 wherein VSCU 8 calculates target driving force τs. This target driving force τs is set according to lane deviation determination flag $F_{LD}$, and according to demanded driving force τm and running resistance force τr calculated at step S24.

Figure 7A:
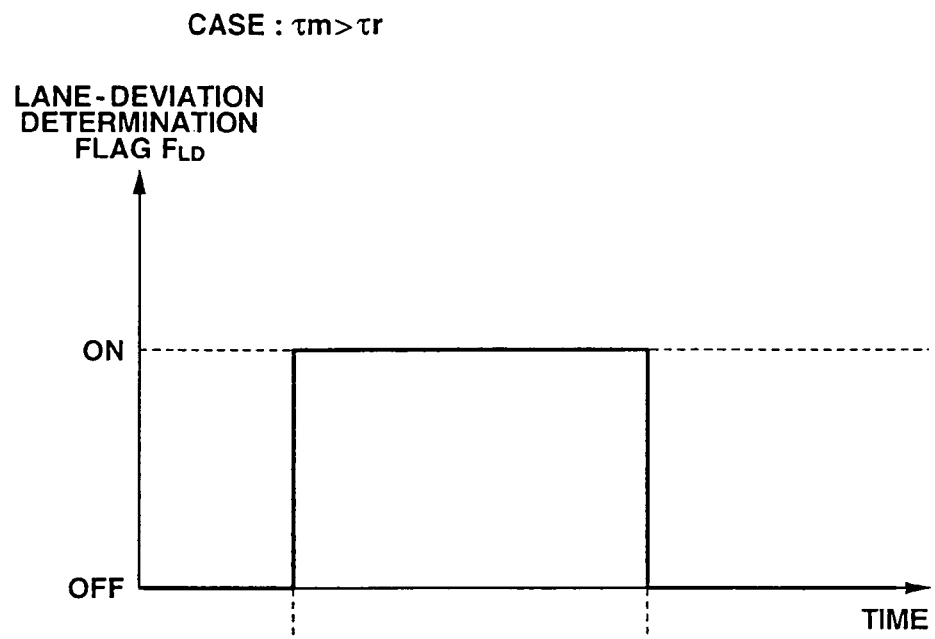
FIGS. 7A and 7B are graphs explaining a setting method of a target driving force employed in the third embodiment.
Figure 7B:
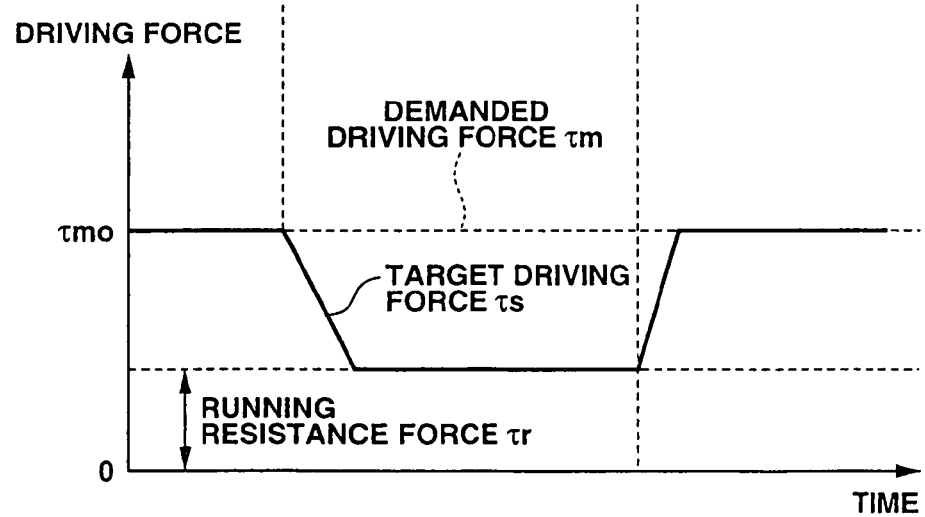

More specifically, when lane deviation determination flag $F_{LD}$ is set at ON and demanded driving force τm is greater than a driving force corresponding to running resistance force τr (τm>τr), target driving force τs is set such that an initial value τm0 of target driving force τs is set at a demanded driving force τm obtained at a moment that lane deviation determination flag $F_{LD}$ is changed to ON and target driving force τs is gradually decreased from the initial value as shown in FIGS. 7A and 7B. When running resistance force τr has a negative value, for example, when the host vehicle travels on a down slope, target driving force τs is gradually decreased to zero.

Herein the driving force is a force for driving the driving wheels and is not a force for accelerating the host vehicle. Accordingly, even when the host vehicle is traveling at a constant speed, the driving force is being generated.

When lane deviation determination flag $F_{LD}$ is set at ON and demanded driving force τm is smaller than or equal to the driving force corresponding to running resistance force τr (τm≦τr), target driving force τs is set at demanded driving force τm.

On the other hand, when lane deviation determination flag $F_{LD}$ is set at OFF, target driving force τs is set at a value which gradually increases from a target driving force τs taken at a moment that lane deviation determination flag $F_{LD}$ is changed from ON to OFF until the increased value corresponds with a sequentially read demanded driving force τm. That is, when it is not determined that the host vehicle is not put in the lane deviation state, target driving force τs is set at demanded driving force τm according to the accelerator opening Acc. When it is determined that the host vehicle is put in the lane deviation state, target driving force τs is set at a driving force suppressed to a value corresponding to running resistance force τr. Even when it is determined that the host vehicle is put in the lane deviation state and when demanded driving force τm is smaller than or equal to resistance driving force τr, target driving force τs is set at demanded driving force τm.

After the setting of target driving force τr, the routine proceeds to step S26 wherein VSCU 8 calculates a target yawing moment Ms generated in the host vehicle so as to suppress the lane deviation. More specifically, when lane deviation determination flag $F_{LD}$ is set at OFF, target yawing moment Ms is set at zero (Ms=0). When lane deviation determination flag $F_{LD}$ is set at ON, target yawing moment Ms is calculated on the basis of the difference (lane deviation quantity) between estimated lateral displacement Xs calculated at step S22 and lane deviation threshold Xc. When Xs≧Xc, target yawing moment Ms is calculated using the following expression (18). When $Xs \leq -Xc$, target yawing moment Ms is calculated using the following expression (19). Herein, a yawing moment directed to a clockwise direction is treated as a positive value. In the expressions (18) and (19), K1 and K2 are proportional coefficients as similar to those employed in the expressions (2) and (3).

$$Ms = -K1 \times K2 \times (Xs - Xc) \quad (18)$$

$$Ms = -K1 \times K2 \times (Xs + Xc) \quad (19)$$

After the calculation of target yawing moment Ms, the routine proceeds to step S27 wherein VSCU 8 calculates target braking force τb. More specifically, VSCU 8 calculates the target brake hydraulic pressure Psi of each wheel on the basis of master cylinder pressure Pm read at step S21 and target yawing moment Ms calculated at step S26 in the same manner of the first embodiment.

Subsequently at step S28 VSCU 8 outputs a control signal to driving torque control unit 12 so as to generate target driving force τs calculated at step S25. More specifically, when lane deviation determination flag $F_{LD}$ is set at OFF, that is, when the host vehicle is not put in the lane deviation tendency, demanded driving force τm corresponding to accelerator opening Acc is generated as shown in FIGS. 7A, 7B, 8A and 8B. When lane deviation determination flag $F_{LD}$ is set at ON, that is, when the host vehicle is put in the lane deviation tendency, the driving force is varied according to the comparison between demanded driving torque τm and running resistance force τr. That is, when demanded driving force τm is greater than running resistance force τr, the driving force corresponding to running resistance force τr which is smaller than demanded driving force τm is generated. When demanded driving force τm is smaller than or equal to running resistance force τr, driving force corresponding to demanded driving force τm is generated.

Subsequently at step S29 VSCU 8 outputs target brake hydraulic pressure Psi of each wheel to brake hydraulic pressure control circuit 7. When lane deviation determination flag $F_{LD}$ is set at ON, VSCU 8 executes the processing of informing vehicle occupants that the host vehicle is put in the lane deviation state by operating alarm monitor 23. Thereafter, the routine returns to the main program.

Subsequently, there is discussed the manner of operation of the third embodiment according to the present invention.

When the host vehicle is traveling on a center of a traveling lane, estimated lateral displacement Xs calculated at step S22 does not satisfy the conditions of $Xs \geq Xc$ and $Xs \leq -Xc$. Therefore, lane deviation determination flag $F_{LD}$ is set at OFF by the execution of step S23, and the yawing moment for avoiding the lane deviation is not generated. Further, when lane deviation determination flag $F_{LD}$ is set at OFF, target yawing moment Ms is set at zero (Ms=0). Accordingly, target driving force τs is set at demanded driving force τm according to accelerator opening Acc. At this moment, since the yawing moment is not generated, the host vehicle performs a vehicle behavior according to the driver's manipulation.

When the host vehicle becomes put into a left side deviation state from the traveling state on the center of the traveling lane, estimated lateral displacement Xs increases. When the condition of $Xs \geq Xc$ is satisfied at last, lane deviation determination flag $F_{LD}$ is set at ON by the execution of step S23.

At this moment, if the host vehicle travels on an upslope and demanded driving force τm according to accelerator opening Acc is greater than running resistance force τr (τm>τr), target driving force τs is set at the value which gradually decreases from the initial value τm0 which is the demanded driving force taken at a moment that lane deviation determination flag $F_{LD}$ is changed from OFF to ON. Further, when target driving force τr decreases to a driving force corresponding to running resistance force τr, target driving force τs is maintained at the driving force corresponding to running resistance force τr.

Therefore, when lane deviation determination flag $F_{LD}$ is changed to ON, target driving force τs is gradually decreased from the driving force corresponding to demanded driving force τm to the driving force corresponding to running resistance force τr as shown in FIGS. 7A and 7B. On the other hand, since lane deviation determination flag $F_{LD}$ is changed to ON, the host vehicle generates the yawing moment corresponding to target yawing moment Ms according to the deviation quantity which corresponds to the difference between estimated lateral displacement Xs and deviation determination threshold Xc.

Herein, if the yawing moment for avoiding the lane deviation is generated by executing the braking force control of one of left and right wheels of the host vehicle under the condition that the running resistance is large, such as under a condition the host vehicle travels on an upslope, the lowering quantity of the vehicle speed V increases as compared with that under the condition that the running resistant is small. Such a change of the vehicle speed V will impress a feeling that the vehicle speed is largely decreased to the driver as a strange feeling.

However, as discussed above, the third embodiment is arranged to suppress demanded driving force τm and to suppress the driving force to be generated to the driving force corresponding to running resistance force τr when the host vehicle is put in the above discussed situation. Accordingly, the driving force of the host vehicle is suppressed at a smaller force, and the braking force for the lane deviation avoidance is generated so that the deceleration feeling applied to the driver becomes small even when the braking force is generated. This suppresses the driver's deceleration feeling due to the operation of the braking force even when the host vehicle is traveling on an upslope.

Further, since the driving force corresponding to running resistance force τr is generated so that the driving force corresponding to running resistance force τr is a lower limit when demanded driving force τm is suppressed, it becomes possible to realize the traveling condition similar to that under a condition that no running resistance force τr is applied to the host vehicle, such as under the condition that the host vehicle travels on a flat road. Since the third embodiment according to the present invention realizes the traveling condition similar to that under a condition that the host vehicle travels on a flat road even when the host vehicle is traveling on an upslope, the lowering of the vehicle speed becomes similar to the lowering under the flat road traveling condition. Therefore, it becomes possible to suppress the deceleration feeling applied to the driver even when the control for the lane deviation avoidance is executed under a traveling condition that the running resistance is large.

Further, since the driving force corresponding to running resistance force τr is being generated during this period, it becomes possible to avoid the driver from having a deceleration feeling caused by the deceleration tendency which is caused by the condition that the driving force becomes smaller than a driving force corresponding to running resistance force τr.

Further, since the third embodiment according to the present invention is arranged such that target yawing moment Ms is generated under this condition that the driving force is being suppress, it becomes possible to suppress the interference between the driving force and the braking force for generating target yawing moment Ms. This enables the control effect of the lane deviation avoidance control to be sufficient ensured.

Further, since the driving force is gradually decreased as shown in FIGS. 7A and 7B when the driving force is to be suppressed, it becomes possible to prevent a radical change of the driving force and to prevent the vehicle behavior of the host vehicle from radically changing.

Further, when lane deviation determination flag $F_{LD}$ is changed to OFF by generating target yawing moment Ms or executing the driver's steering manipulation to recover the lane deviation tendency of the host vehicle, target driving force τs is gradually increased until target driving force τs corresponds with demanded driving force τm according to the sequentially read accelerator opening Acc. Therefore, when lane deviation determination flag $F_{LD}$ is changed to OFF, the generation of target yawing moment Ms is stopped and the driving force is gradually recovered to the driving force according to the manipulation quantity of the accelerator pedal. Further, the driving force according to the manipulation quantity of the accelerator pedal is generated, and the condition of the host vehicle is recovered to a running condition according to the manipulation of the accelerator pedal. Herein, since the driving force is gradually increased as shown in FIGS. 7A and 7B when the driving force is to be increased, it becomes possible to prevent a radical change of the driving force and to prevent the vehicle behavior of the host vehicle from radically changing.

On the other hand, when lane deviation determination flag $F_{LD}$ is changed to ON and the host vehicle travels on a flat road or slow upslope, such as when demanded driving force τm is smaller than or equal to τr, target driving force τs is set at demanded driving force τm continuously so as not to suppress the driving force. Therefore, the suppression of the driving force is not executed, and the driving force corresponding to demanded driving force τm, which is smaller than or equal to running resistance force τr, is generated. In this situation, since demanded driving force τm is smaller than or equal to the driving force corresponding to running resistance force τr and the generated driving force is relatively small, the deceleration feeling applied to the driver is relatively small even if the braking force is generated under this condition. Further, since demanded driving force τm is smaller than or equal to the driving force corresponding to running resistance force τr and the driver estimates the lowering of the vehicle speed at this moment, the driver does not have the strange feeling even if the vehicle speed is decreased by the generation of the yawing moment.

Further, under the condition that demanded driving force τm is smaller than or equal to the driving force corresponding to running resistance force τr and there is a tendency of the deceleration of the host vehicle, even if the control effect by the lane deviation avoidance control is slightly decreased by the interference between the braking force for generating target yawing moment Ms and the driving force corresponding to demanded driving force τm, the host vehicle is put in the deceleration tendency due to the driving force smaller than or equal to running resistance force τr. As a result, it becomes possible to sufficiently ensure the control effect of the lane deviation avoidance control.

Furthermore, when running resistance force τr becomes a negative value and acts as a force of accelerating the host vehicle, such as when the host vehicle travels on a down slope, demanded driving force τm according to accelerator opening Acc becomes greater than the driving force corresponding to running resistance force τr usually. Therefore, initial value τm0 is set at the demanded driving force τm taken at a moment that lane deviation determination flag $F_{LD}$ is changed to ON, and target driving force τs is set at a value which gradually decreases from this initial value τm0. Further, when target driving force is decreased to a value corresponding to zero, target driving force τs is set at zero hereinafter.

Accordingly, when lane deviation determination flag $F_{LD}$ is changed to ON, the driving force is gradually decreased from the force corresponding to demanded driving force τm to zero. Simultaneously, the yawing moment corresponding to target yawing moment Ms according to the deviation quantity of the host vehicle from the traveling lane is generated.

Therefore, in case that the host vehicle is put in the lane deviation tendency on a down slope and the driving force is generated by the control intervention for the lane deviation avoidance, there is a possibility of applying the deceleration feeling to the driver in some cases. However, since the driving force is suppressed in case that the lane deviation is detected, it is possible to suppress the lane deviation while decreasing the deceleration feeling applied to the driver. Further, since it is possible to suppress the interference between the driving force and the yawing moment for the lane deviation avoidance, it becomes possible to suppress the decrease of the control effect by the lane deviation avoidance control.

Since the third embodiment according to the present invention is arranged so as to generate the yawing moment corresponding to target yawing moment Ms generated according to the deviation quantity of the host vehicle from the traveling lane and to suppress the driving force upon taking account of the running resistance applied to the host vehicle, it becomes possible to ensure the control effect of the lane deviation avoidance control and to suppress the deceleration feeling caused by the operation of the braking force of generating the yawing moment.

Although the third embodiment has been shown and described so as to suppress only the demanded driving force τm while maintaining target yawing moment Ms, the invention is not limited to this and may be arranged to control target yawing moment Ms according to the suppression degree of the driving force as is discussed in the first embodiment.

In the third embodiment according to the present invention according to the present invention, the processing at step S23 in FIG. 6 corresponds to lane deviation detecting means. The processing at steps S26, S27 and S29 corresponds to lane deviation avoidance controlling means. Driving torque control unit 12 and engine 9 correspond to driving force generating means. The processing of calculating demanded driving force τm according accelerator opening sent from accelerator opening sensor 18, which processing is executed in driving torque control unit 12, corresponds to driving force demanded quantity detecting means. The processing executed at step S24 in FIG. 6 corresponds to running resistance force detecting means. The processing of suppressing the driving force according to the magnitude of the running resistance force, which processing is executed at step S27, corresponding to a driving force suppressing means.

Subsequently, there is discussed a fourth embodiment according to the present invention.

The fourth embodiment according to the present invention is different from the first embodiment in the calculation processing executed by VSCU 8. Further, VSCU 8 of the fourth embodiment is arranged to receive a driving torque Tw of an axle of the wheels, which is controlled by driving torque control unit 12, engine torque τa detected by driving toque control unit 12 and demanded driving torque τm according to accelerator opening Acc.

Figure 9:
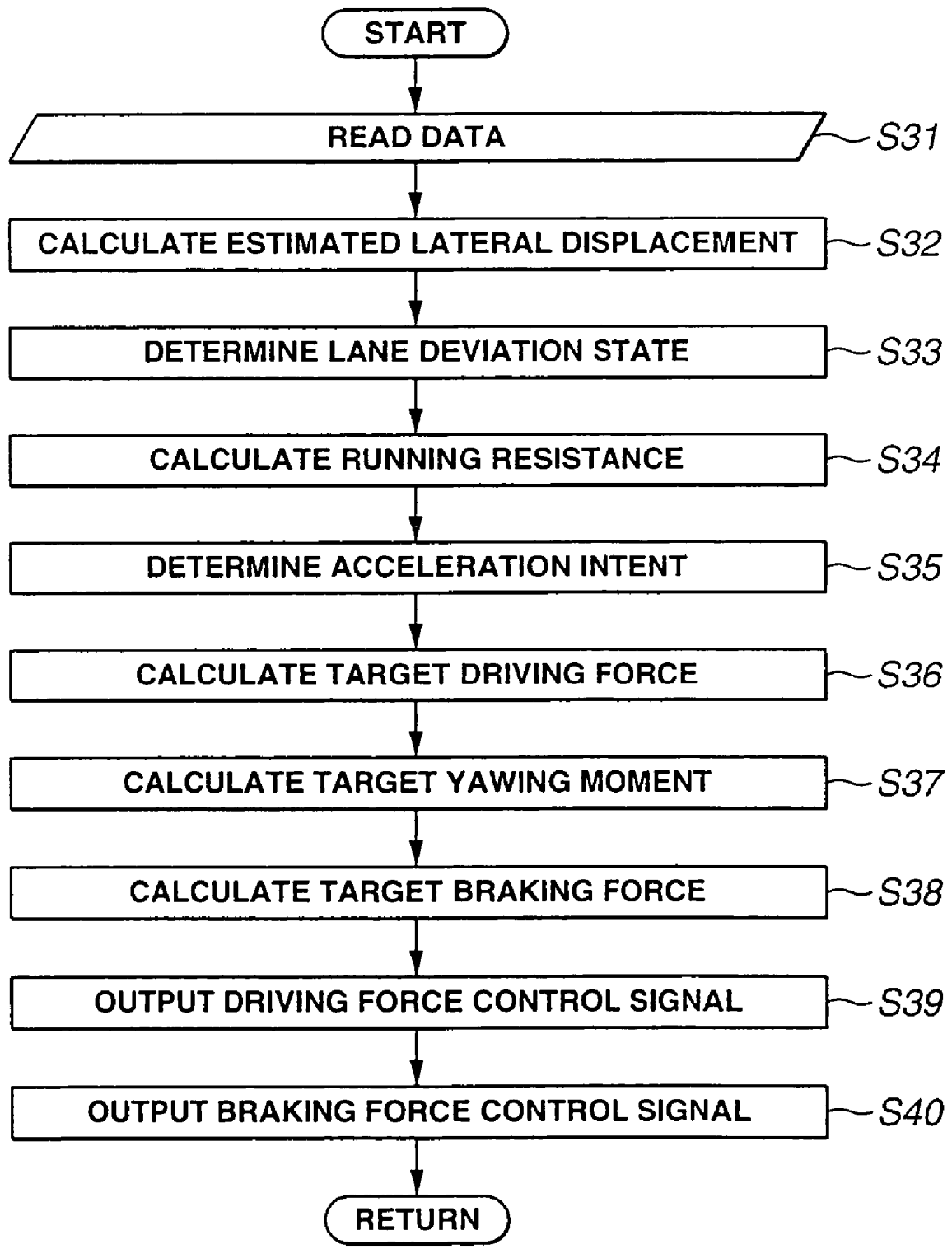
FIG. 9 is a flowchart showing a processing executed in a fourth embodiment according to the present invention.

FIG. 9 shows a flowchart showing a procedure of a calculation processing executed in the fourth embodiment according to the present invention.

The processing from step S31 to step S34 in FIG. 9 is the same as that from step S21 to step S24 in FIG. 6 of the third embodiment. That is, at step S31 VSCU 8 reads various data including driving torque Tw, engine torque τa and demanded driving torque τm. At step S32 VSCU 8 calculates estimated lateral displacement Xs. At step S33 VSCU 8 determines the lane deviation state by comparing lateral displacement Xs and lane deviation determination threshold Xc. At step S34 VSCU 8 calculates running resistance force τr of the host vehicle at the present moment.

Subsequently, at step S35 VSCU 8 determines whether or not the driver of the host vehicle has an acceleration intent. More specifically, when demanded driving force τm read at step S31 is greater than or equal to an acceleration intent determination threshold τth (τm≧τth), it is determined that the driver bas the acceleration intent, and therefore an acceleration intent flag Fac is set at ON. On the other hand, when demanded driving force τm read at step S31 is smaller than acceleration intent determination threshold τth (τm<τth), it is determined that the driver does not have the acceleration intent, and therefore acceleration intent flag Fac is set at OFF.

At step S36 VSCU 8 calculates target driving force τs. When lane deviation determination flag $F_{LD}$ is set at ON, target driving force τs is set according to acceleration intent flag Fac. First when acceleration intent flag Fac is set at ON, target driving force τth is set at demanded driving force τm. When target driving force τs is not set at demanded driving force τm at a moment that both of lane deviation determination flag $F_{LD}$ and acceleration intent flag Fac are set at ON, target driving force τs is gradually increased and is corresponded with demanded driving force τm.

On the other hand, when lane deviation determination flag $F_{LD}$ is set at ON and acceleration intent flag Fac is set at OFF, demanded driving force τm and a driving force corresponding to running resistance force τr are compared. When demanded driving force τm is greater than the driving force corresponding to running resistance force τr (τm>τr), an initial value τm0 is set at a demanded driving force τm taken at a moment that lane deviation determination flag FLD is set at ON and acceleration intent flag is set at OFF, and target driving force τs is set at a value which is gradually decreased from the initial value τm0 to the driving force corresponding to running resistance force τr. When running resistance force τr is a negative value and acts as an accelerating force of the host vehicle, such as when the host vehicle travels on a down slope, target driving force τs is set at a value which is gradually decreased from demanded driving force τm to zero.

On the other hand, when demanded driving force τm is smaller than running resistance force τr, target driving force τs is set at demanded driving force τm.

When lane deviation determination flag FLD is set at OFF, target driving force τs is set at demanded driving force τm. When demanded driving force τm taken at a moment that lane deviation determination flag $F_{LD}$ is changed to OFF is not corresponded with target driving force τs, target driving force τs is set at a value which gradually increased from an initial value which is a target driving force τs at this moment.

Figure 10:
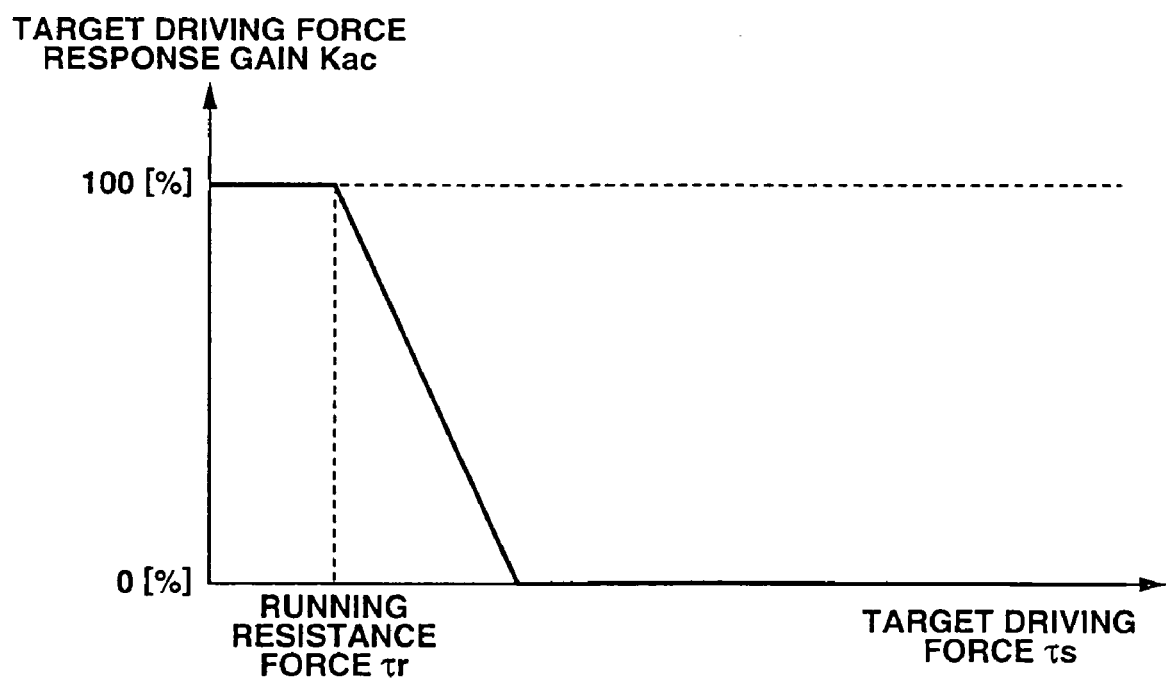
FIG. 10 is a map employed in the processing of the third embodiment.

After the setting of target driving force τs, the routine proceeds to step S37 wherein VSCU 8 calculates target yawing moment Ms generated in the host vehicle to suppress the lane deviation of the host vehicle. More specifically, when lane deviation determination flag $F_{LD}$ is set at OFF, target yawing moment Ms is set at zero (Ms=0). Only when lane deviation flag $F_{LD}$ is set at ON, target yawing moment Ms is calculated on the basis of the difference between estimated lateral displacement Xs calculated at step S32 and lane deviation determination threshold Xc. More specifically, when Xs≧Xc, target yawing moment Ms is calculated using the following expression (20). When Xs≦−Xc, target yawing moment Ms is calculated using the following expression (21).

$$Ms = -K1 \times K2 \times Kac \times (Xs - Xc) \qquad (20)$$

$$Ms = -K1 \times K2 \times Kac \times (Xs + Xc) \qquad (21)$$

where Kac is a target driving force response gain Kac which is set according to target driving force τs and is set as shown by a graph shown in FIG. 10.

In FIG. 10, a horizontal axis is target driving force τs, and a vertical axis is target driving force response gain Kac. When target driving force τs is smaller than a driving force corresponding to running resistance force τr, target driving force response gain Kac is set at 100%. Then, when target driving force τs becomes greater than the driving force corresponding to running resistance force τr and is increasing, target driving force response gain Kac is degreased at a predetermined decreasing rate which is in inverse proportion to the difference between driving force τs and the driving force corresponding to running resistance force τr. When target driving force response gain Kac reaches 0% and target driving force τs becomes greater than the target driving force τs taken at a moment that target driving force response gain Kac reaches 0%, target driving force response gain Kac is maintained at zero regardless of the increase of target driving force τr. Herein, when running resistance force τr is a negative value and acts as an accelerating force of accelerating the host vehicle, target driving force response gain Kac is set at 0%.

That is, when target driving force τs smaller than running resistance force τr and therefore it is estimated that the deceleration feeling due to the generation of the braking force for generating the yawing moment is almost not caused, target driving force response gain Kac is set such that target yawing moment Ms is set at a yawing moment according to the lane deviation quantity. Inversely, when target driving force τs is greater than running resistance force τr and therefore it is estimated that the deceleration feeling due to the generation of the braking force for generating the yawing moment is relatively large, target yawing moment Ms is suppressed so as to decrease the deceleration feeling due to the generation of the braking force for generating the yawing moment. This suppresses the deceleration feeling applied to the driver. Further, in order to avoid target yawing moment Ms from radically changing when target driving force response gain Kac is changed between 0% and 100%, the fourth embodiment according to the present invention is arranged to gradually change target driving force response gain Kac according to the change of target driving force τs.

After the calculation of target yawing moment, the routine proceeds to step S38. Hereinafter, the processing from steps S38, S39 and S40 is executed as is similar to that of steps S6 through S6 in FIG. 2 discussed in the first embodiment. More specifically, at step S38 VSCU 8 calculates target brake hydraulic pressure Psi for each wheel. At step S39 VSCU 8 outputs a driving force control signal to driving torque control unit 12 so as to generate the target driving force calculated at step S36. At step S40 VSCU 8 outputs a braking force control signal indicative of target brake hydraulic pressure Psi calculated at step S38 to brake hydraulic pressure control circuit 7. Further, when lane deviation determination flag $F_{LD}$ is set at ON, VSCU 8 executes a processing of informing that the host vehicle is put in the lane deviation tendency by operating alarm monitor 23. Thereafter, the routine returns to the main routine.

Subsequently, there is discussed the manner of operation of the fourth embodiment according to the present invention.

When the host vehicle is traveling on a center of a traveling lane, lane deviation determination flag $F_{LD}$ is set at OFF and target yawing moment Ms is set at zero (Ms=0). Further, target driving force τs is set at demanded driving force τm according to accelerator opening Acc, and therefore the target driving force is generated according to the manipulation quantity of the accelerator pedal manipulated by the driver.

When the host vehicle is put in the left hand side lane deviation tendency from the above discussed non-deviation state, estimated lateral displacement Xs increases and a condition of Xs≧Xc is satisfied. In response to the change of the condition, lane deviation determination flag $F_{LD}$ is set at ON by the execution of step S33. At this moment, if there is the acceleration intent of the driver and the accelerator pedal is depressed by the driver, it is determined that there is the acceleration intent when demanded driving force τm becomes greater than or equal to acceleration intent determination threshold τth, and acceleration intent flag Fac is set at ON.

Since lane deviation determination flag $F_{LD}$ is set at ON and acceleration intent flag Fac is also set at ON, target driving force τs is set at demanded driving force τm. Before lane deviation determination flag $F_{LD}$ is set at ON, that is, when lane deviation determination flag $F_{LD}$ is set at OFF, target driving force τs is set at demanded driving force τm. Therefore target driving force τs is maintained at demanded driving force τm when lane deviation determination flag $F_{LD}$ is changed to ON, and the driving force according to the accelerator manipulation by the driver is generated.

Further, when target driving force τs is greater than running resistance force τr, target driving force response gain Kac is set at a value smaller than 100% according to the magnitude of target driving force τs, and target yawing moment Ms is also suppressed. Therefore, the driving force according to the manipulation quantity of the accelerator pedal is generated according to the acceleration intent of the driver, and the yawing moment generated according to the magnitude of the driving force is suppressed.

Herein, when the host vehicle travels on an upslope and the braking force for generating the yawing moment is generated, there is a possibility that the driver has a deceleration feeling in some cases. However, since target yawing moment Ms is suppressed according to the magnitude of target driving force τs, it becomes possible to suppress the driver's deceleration feeling caused according to the magnitude of the braking force. Further, since target yawing moment Ms is suppressed to have a smaller value according to the increase of demanded driving force τs, the suppression of the yawing moment is decreased as it is estimated that the deceleration feeling applied to the driver becomes large due to the application of the braking force caused by the large driving force. Therefore, it becomes possible to accurately suppress the deceleration feeling applied to the driver.

Accordingly, even when the host vehicle travels on an upslope, no deceleration feeling is applied to the driver, and therefore it becomes possible to execute the lane deviation avoidance by generating the yawing moment while generating the driving force according to the driver's acceleration intent.

On the other hand, when both of lane deviation determination flag $F_{LD}$ and acceleration intent flag Fac are set at ON and target driving force τs is smaller than or equal to running resistance force τr, target driving force response gain Kac is set at 100%. Therefore, target yawing moment Ms is set at the yawing moment according to the deviation quantity of the host vehicle.

Accordingly, the driving force corresponding to demanded driving force τm is generated and the yawing moment according the deviation quantity of the host vehicle. However, since target driving force τs is smaller than or equal to running resistance force τr and the driver anticipates the lowering of the vehicle speed, the driver does almost not have the deceleration feeling under a condition that the host vehicle travels on an upslope and the lowering of the vehicle speed is generated by the generation of the yawing moment.

Under a condition that the driver does not have the acceleration intent and lane deviation determination flag $F_{LD}$ is set at ON, when demanded driving force τm is greater than the driving force corresponding to running resistance force τr, target driving force τs is gradually decreased from demanded driving force τm to running resistance force τr. Further, target driving force response gain Kac is changed from 0% to 100% according to the lowering of target driving force τs. Accordingly, target yawing moment Ms increases as target driving force τs decreases, and the yawing moment according the deviation quantity of the host vehicle from the traveling lane is generated.

Therefore, when the driver does not have the acceleration intent, the generated yawing moment is sufficiently large to avoid the lane deviation of the host vehicle. Further, when demanded driving force τm is greater than the driving force corresponding to running resistance force τr, target driving force τs is suppressed at the driving force corresponding to running resistance force τr. Therefore, even if the braking force for generating the yawing moment is generated under the condition that the host vehicle travels on an upslope, it is possible to decrease the deceleration feeling applied to the driver and to sufficiently ensure the control effect of the lane deviation avoidance control. Further since the driving force corresponding to running resistance force τr is generated, it becomes possible to avoid the driver from having the deceleration feeling from the shortage of the driving force caused by the condition that the driving force becomes smaller than or equal to running resistance force τr.

On the other hand, when lane deviation determination flag $F_{LD}$ is set at ON and demanded driving force τm is smaller than the driving force corresponding to running resistance force τr under a condition that the driver does not has the acceleration intent, target driving force τs is set at demanded driving force τm. Since target driving force τs (corresponding with demanded driving force τm) is smaller than or equal to the driving force corresponding to running resistance force τr, target driving force response gain Kac is set at 100%.

In this situation, demanded driving force τm is smaller than the driving force corresponding to running resistance force τs and the generated driving force is relatively small. Accordingly, even when the host vehicle travels on an upslope and the braking force is applied to the host vehicle, the deceleration feeling applied to the driver is relatively small. Further, in this situation demanded driving force τm is smaller than or equal to running resistance force τr and the driver anticipates the lowering of the vehicle speed in some degree. Therefore, even if the lowering of the vehicle speed is generated by generating the yawing moment, the driver does not has the deceleration feeling. This ensures the control effect by the lane deviation avoidance control without applying the deceleration feeling to the driver.

When the host vehicle is put in the lane deviation tendency and in the vehicle speed decelerating tendency due to the condition that target driving force τs is smaller than the driving force corresponding to the driving force corresponding to running resistance force τr, there is caused an interference between the braking force for generating target yawing moment Ms and the driving force corresponding to demanded driving force τm. Although the control effect by the lane deviation avoidance control is slightly decreased under this situation, the vehicle speed deceleration tendency of the host vehicle increases at this rate. As a result, it becomes possible to sufficiently ensure the control effect by the control for the lane deviation avoidance.

When running resistance force τr is a negative value and acts to accelerate the host vehicle, such as when the host vehicle travels on a down slope under a condition that the host vehicle is put in the lane deviation tendency ($F_{LD}$=ON) and the driver does not has the acceleration intent (Fac=OFF), demanded driving force τm according to accelerator opening Acc becomes greater than running resistance force τr constantly. Therefore, initial value τm0 is set at demanded driving force τm obtained at a moment that lane deviation determination flag $F_{LD}$ is changed to ON, and target driving force τs is set at the value which is gradually decreased from this initial value τm0. Further, when target driving force τs reaches a value corresponding to zero, target driving force τs is maintained at zero thereafter, and target driving force response gain Kac is set at 100%.

Therefore, when lane deviation determination flag $F_{LD}$ is changed to ON, the driving force is gradually decreased from the driving force corresponding to demanded driving force τm and then reaches zero. Simultaneously the yawing moment corresponding to target yawing moment according to the lane deviation quantity of the host vehicle from the traveling lane is generated.

Accordingly, when the braking force is generated by the intervention of the lane deviation avoidance control under a condition that the host vehicle travels on a down slope, there is a possibility that the driver has the deceleration feeling thereby in some cases. However, since the driving force is suppressed, the deceleration feeling applied to the driver is suppressed and the lane deviation is also suppressed. Further, since the driving force is suppressed, the interference between the driving force and the braking force for generating the yawing moment is suppressed, and the decrease of the control effect by the control for the lane deviation avoidance is also suppressed.

As discussed above, since the fourth embodiment according to the present invention has been arranged to generate the yawing moment corresponding to target yawing moment Ms according to the lane deviation quantity of the host vehicle from the traveling lane and to suppress the driving force upon taking account of the running resistance applied to the host vehicle, it becomes possible to suppress the deceleration feeling caused by the operation of the braking force for generating the yawing moment while sufficiently ensuring the control effect by the control for the lane deviation avoidance as is similar to those in the third embodiment.

The third embodiment may be arranged to determine as to whether or not the driver has the acceleration intent and to output target driving force τs and target yawing moment Ms according to the determination of the acceleration intent, as is similar to the manner of the fourth embodiment.

Although the third and fourth embodiments according to the present invention have been shown and described such that in case that target driving force τs is suppressed, target driving force τs is suppressed to the driving force corresponding to running resistance force τr, the invention is not limited to this, and target driving force τs may be suppressed at a value greater than the driving force corresponding to running resistance force τr. Since it is possible to decrease the deceleration feeling due to the braking force for generating the yawing moment as the driving force becomes smaller, the driving force may be suppressed upon taking account of the deceleration feeling applied to the driver.

Although the third and fourth embodiments have been shown and described such that the lane deviation avoidance is executed by generating the yawing moment, the invention is not limited to this, a deceleration necessary for avoiding the lane deviation may be generated to avoid the lane deviation as is similar to the second embodiment. That is, the feature discussed in the third and fourth embodiments is applicable to a lane deviation avoidance system which is arranged to avoid the lane deviation by controlling the braking force by controlling the braking force.

Although the first through fourth embodiments according to the present invention have been shown and described as to the case of the left hand side lane deviation, the lane deviation avoidance system of these embodiments similar executes the lane deviation avoidance control as to the case of the right hand side lane deviation.

Although each of the embodiments according to the present invention has been shown and described so as to be adapted to a case of generating the driving force according to the depression of the accelerator pedal, of using accelerator opening sensor 18 as driving force demanded quantity detecting means and of suppressing the driving force varied according to accelerator opening Acc, the application of the invention is not limited to this, and may be adapted, for example, to a case that a driving force is generated according to a driving torque command value outputted from a known following control system for traveling while keeping an inter-vehicle distance between a preceding vehicle and a host vehicle at a constant distance and/or for traveling at a desired constant vehicle speed. In such a case, it is preferable that such system is arranged to detect the driving torque command value using a driving force demanded quantity detecting means and to suppress the driving force determined by the driving torque command value.

In the fourth embodiment according to the present invention, the processing executed at step S33 in FIG. 9 corresponds to lane deviation detecting means. The processing executed at steps S37, S38 and S40 corresponding to lane deviation avoidance controlling means. Driving torque control unit 12 and engine 9 correspond to driving force generating means. The processing of calculating demanded driving force τm according to accelerator opening Acc sent from accelerator opening sensor 18, which processing is executed in driving torque control unit 12, corresponds to driving force demanded quantity detecting means. The processing executed at step S34 in FIG. 9 corresponds to running resistance force detecting means. The processing of suppressing the driving force according to the magnitude of running resistance force, which is executed at step S36, corresponds to driving force suppressing means. The processing executed at step S35 corresponds to acceleration intent determining means.

Subsequently, there is discussed a fifth embodiment of the lane deviation avoidance system according to the present invention.

This fifth embodiment is basically the same as the first embodiment except that the processing executed by vehicle state control unit (VSCU) 8 is different from that in the first embodiment. Therefore, the explanation of the same parts is omitted herein.

Figure 11:
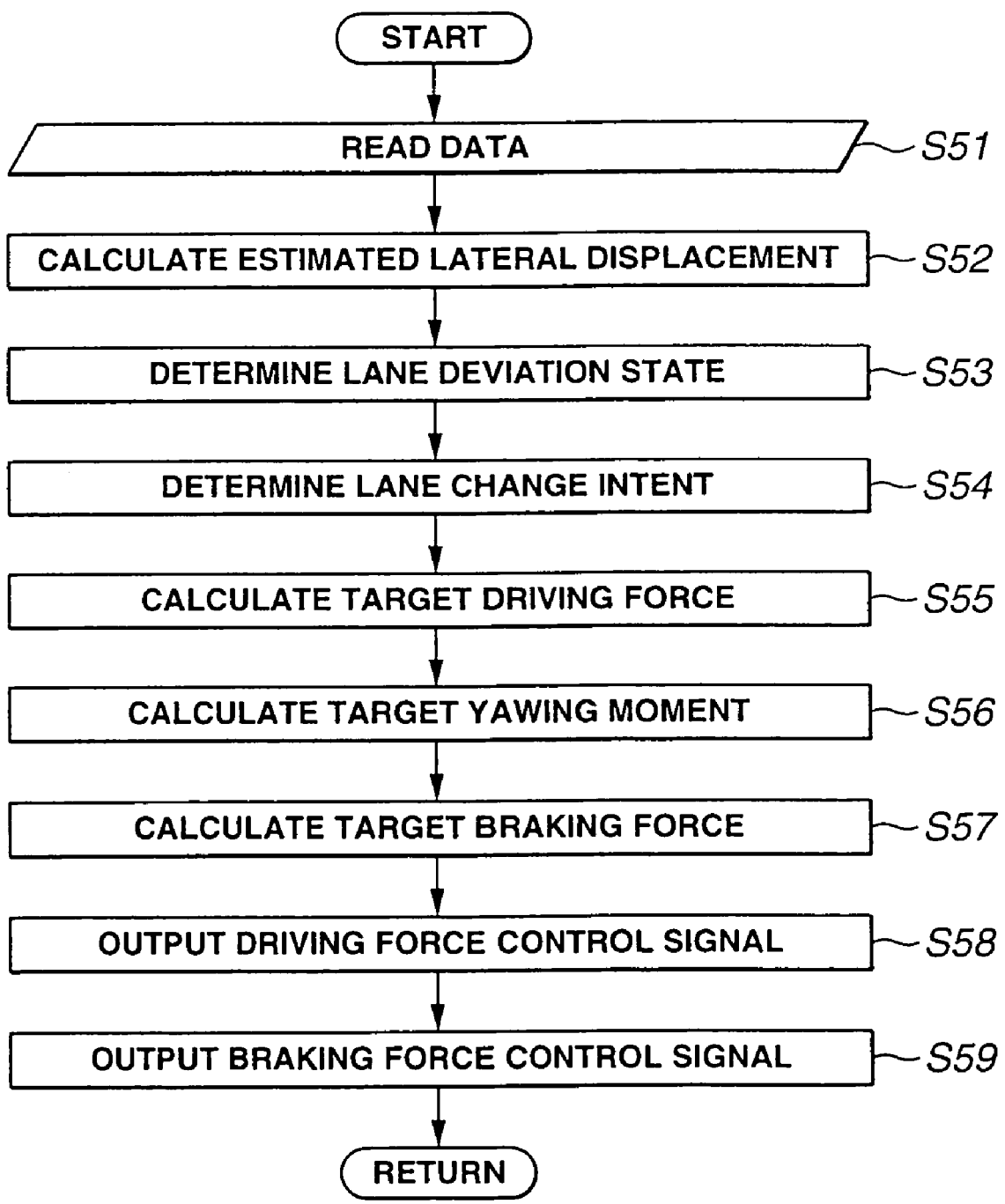
FIG. 11 is a flowchart showing a processing executed in a fifth embodiment according to the present invention.

In this fifth embodiment, VSCU 8 executes a calculation processing as shown by a flowchart of FIG. 11. The calculation processing of the fifth embodiment specially arranged to determine an lane change intent of the driver at step S54. The processing executed at steps S51 through S53 in FIG. 11 is the same as the processing executed at steps S1 through S3 in FIG. 2. That is, at step S51 VSCU 8 reads various data including driving torque Tw, engine torque τa and demanded driving torque τm. At step S52 VSCU 8 calculates estimated lateral displacement Xs. At step S53 VSCU 8 executes the lane deviation determination by comparing estimated lateral displacement Xs and deviation determination threshold Xc.

Figure 12A:
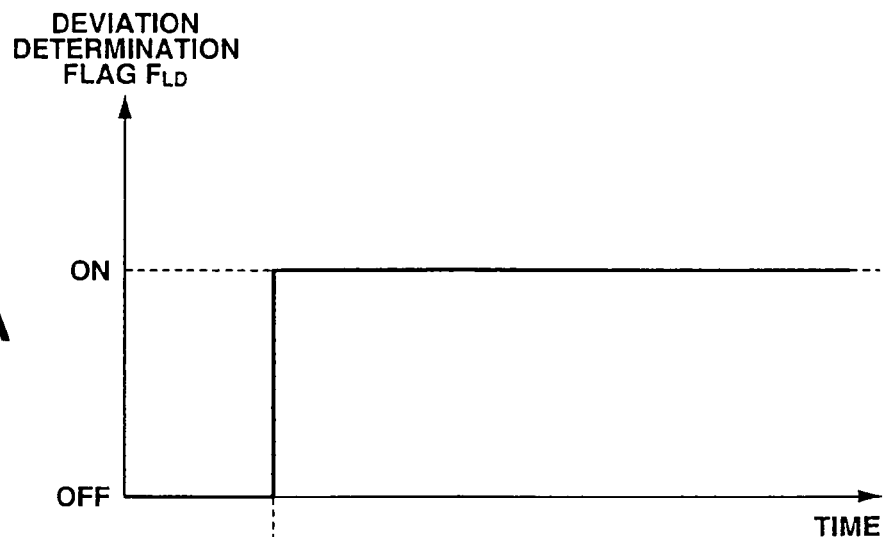
FIGS. 12A, 12B and 12C are graphs explaining a setting method of a lane change flag employed in the fifth embodiment.
Figure 12B:
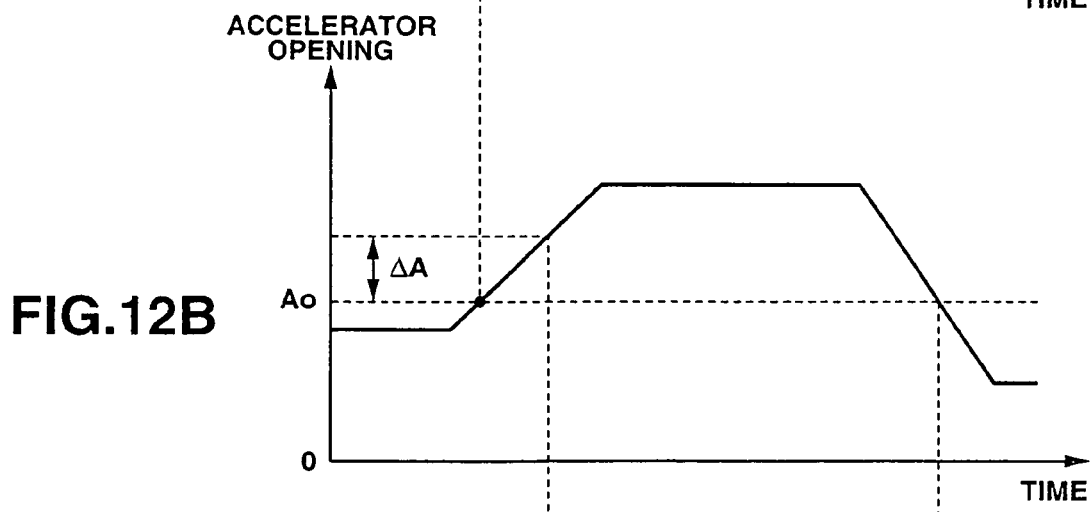
Figure 12C:
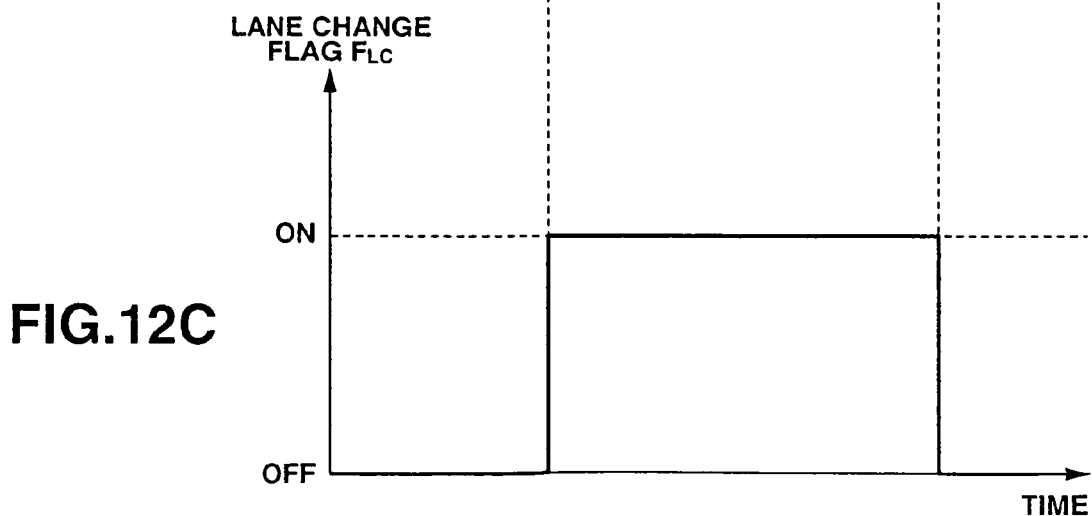

Subsequently, at step S54 VSCU 8 determines based on accelerator opening Acc whether or not the driver has a lane change intent of executing a lane change. More specifically, as shown in FIGS. 12A, 12B and 12C, an initial value A0 is set at an accelerator opening Acc taken at a moment that lane deviation determination flag $F_{LD}$ is changed to ON, and it is determined that the driver has the lane change intent when a newest accelerator opening Acc, which is read by each processing cycle of the processing, becomes greater than or equal to a sum of initial value A0 and an increment threshold ΔA (Acc≧A0+ΔA). Thereafter, when accelerator opening Acc becomes smaller than or equal to initial value A0, it is determined that the lane change is terminated or cancelled.

That is, when the driver has the lane change intent, the driver usually accelerates the host vehicle for executing the lane change. Accordingly, when the change of the manipulation quantity of the accelerator pedal becomes greater than increment threshold ΔA after VSCU 8 detects the lane deviation of the host vehicle, that is, when it is determined that the driver further depressed the accelerator pedal after the lane deviation is detected, it is determined that the driver has the lane change intent. Inversely, when the change of the manipulation quantity of the accelerator pedal does not become grater than increment threshold ΔA, that is, when the driver does further depress the accelerator pedal, it is determined that the driver does not have the lane change intent.

Herein, although the explanation has been made such that the lane change is terminated or cancelled when accelerator opening Acc becomes smaller than initial value A0, the determination as to the lane change is not limited to this disclosure. For example, the determination that the lane change is terminated or cancelled may be made when accelerator opening Acc becomes smaller than the sum of initial value A0 and increment threshold ΔA (Acc<A0+ΔA).

When it is determined that the lane change is carried out, a lane change flag $F_{LC}$ is set at ON. When it is determined that the lane change is terminated or cancelled, lane change flag $F_{LC}$ is set at OFF. When lane deviation determination flag $F_{LD}$ is set at OFF, lane change flag $F_{LC}$ is always set at OFF. Further, when lane deviation determination flag $F_{LD}$ is set at OFF, initial value A0 is sequentially updated by newly read accelerator opening Acc.

Although the explanation has been made such that lane change flag $F_{LC}$ is set at OFF when accelerator opening Acc becomes smaller than or equal to initial value A0, the determination as to the lane change is not limited to this. For example, the determination may be made such that lane change flag $F_{LC}$ is set at OFF when lane deviation determination flag $F_{LD}$ is changed to OFF.

Increment threshold ΔA of the accelerator opening may be set at a fixed value. Increment threshold ΔA of the accelerator opening may be varied according to the accelerator opening as shown in FIG. 14A, or may be varied according to vehicle speed V of the host vehicle as shown in FIG. 13B.

Figure 13A:
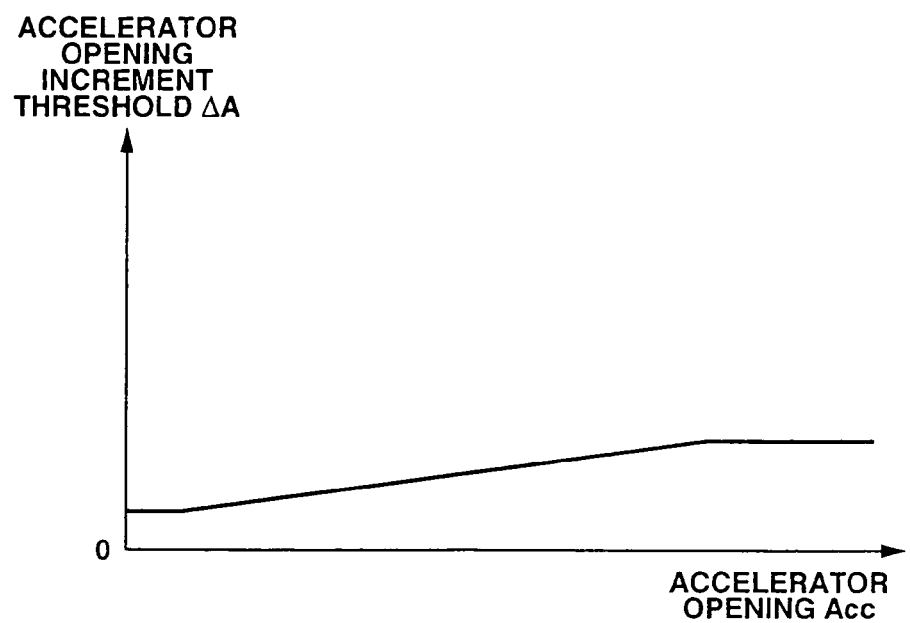
FIGS. 13A and 13B are control maps employed in the processing of the fifth embodiment.

In FIG. 13A, a horizontal axis is accelerator opening Acc, and a vertical axis is increment threshold ΔA of the accelerator opening. When accelerator opening Acc is relatively small, increment threshold ΔA is set at a relative small constant value. Then, as accelerator opening Acc increases, increment threshold ΔA increases in proportion to accelerator opening Acc. When accelerator opening Acc is in a relatively large range, increment threshold ΔA is set at a relative large constant value.

Figure 13B:
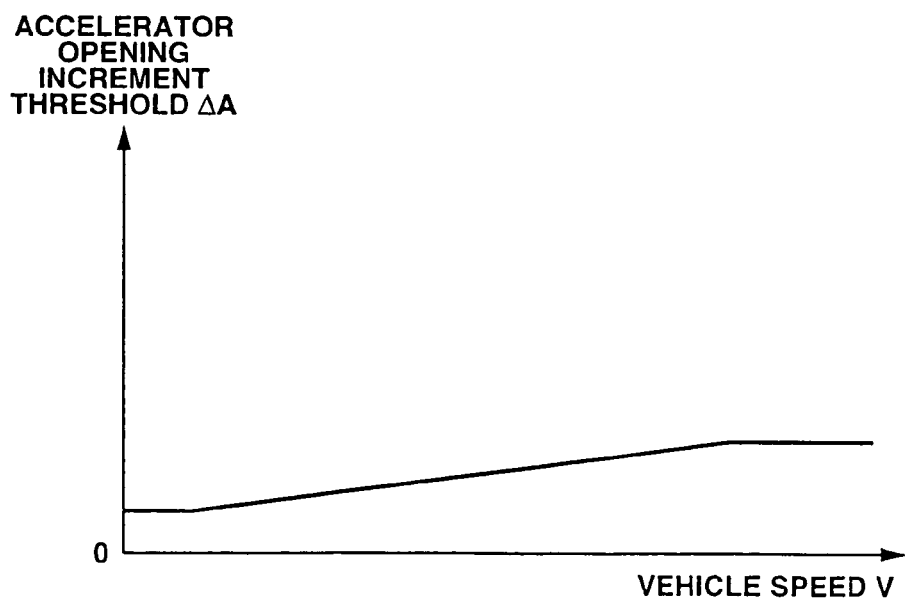
Figure 14A:
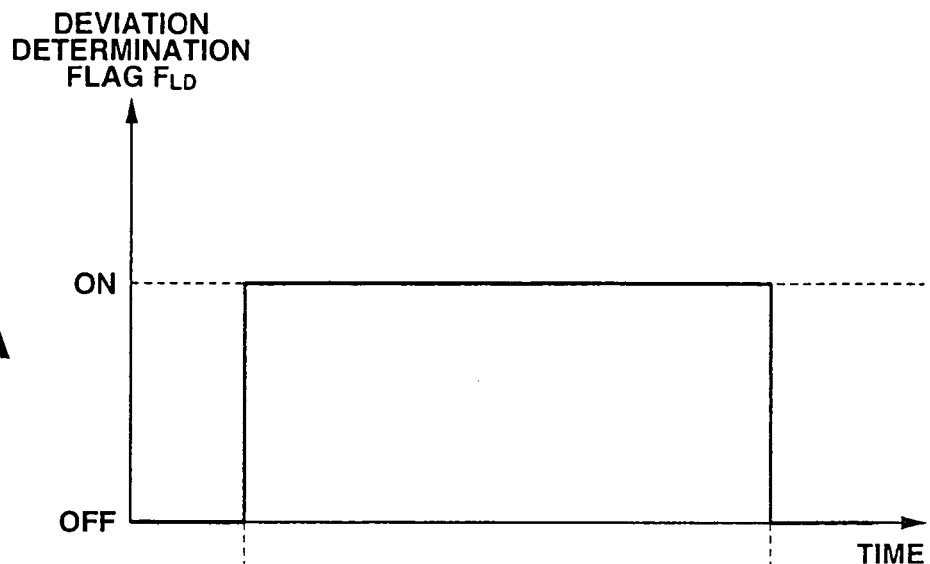
FIGS. 14A, 14B and 14C are graphs explaining a setting method of a lane change flag employed in the processing of the fifth embodiment.

In FIG. 13B a horizontal axis is vehicle speed V, and a vertical axis is increment threshold ΔA of accelerator opening Acc. When vehicle speed V is relatively small, increment threshold ΔA is set at a relative small constant value. Then, as vehicle speed V increases, increment threshold ΔA increases in proportion to vehicle speed. When vehicle speed V is in a relatively large range, increment threshold ΔA is set at a relative large.

Even when the driver tries to maintain the depression quantity of the accelerator pedal constant, a fluctuation of the depression quantity is normally caused. Therefore, accelerator opening Acc also fluctuates within a range according to the fluctuation of the depression quantity of the accelerator pedal. During this period, the fluctuation of accelerator opening Acc according to the fluctuation of the depression quantity of the accelerator pedal becomes large as accelerator opening Acc becomes large.

When increment threshold ΔA of accelerator opening is set at a fixed value, there is a possibility that the fluctuation of accelerator opening Acc according to the depression quantity of the accelerator pedal becomes greater than increment threshold ΔA. Actually, there is a case that even when the acceleration pedal is not actually further depressed, it is erroneously determined that the accelerator pedal is further depressed, and that the erroneous determination is made such that the drive has the lane change intent. In order to prevent such erroneous determination, increment threshold ΔA is varied according to accelerator opening Acc. Accordingly, even when the fluctuation quantity of accelerator opening Acc due to the fluctuation of the depression quantity of the accelerator pedal in the depression state is varied according to accelerator opening Acc, it becomes possible to accurately determine whether or not the further depression of the acceleration pedal is executed. That is, it becomes possible to accurately detect whether or not the driver has the lane change intent.

During the constant speed traveling of the host vehicle, accelerator opening Acc decreases as vehicle speed V decreases, and accelerator opening Acc increases as vehicle speed V increases. Therefore, by varying increment threshold ΔA according to vehicle speed V, it becomes possible to gain the operation advantages gained by the control of varying increment threshold ΔA according to accelerator opening Acc.

Subsequently, the routine proceeds to step S55 wherein VSCU 8 calculates target driving force τs. More specifically, VSCU 8 calculates a pseudo-accelerator-opening As which is an accelerator opening corresponding to target driving force τs. pseudo-accelerator-opening As is calculated on the basis of accelerator opening Acc read from accelerator opening sensor 18 at step S51 and according to lane deviation determination flag $F_{LD}$ and lane change flag $F_{LC}$.

Figure 14B:
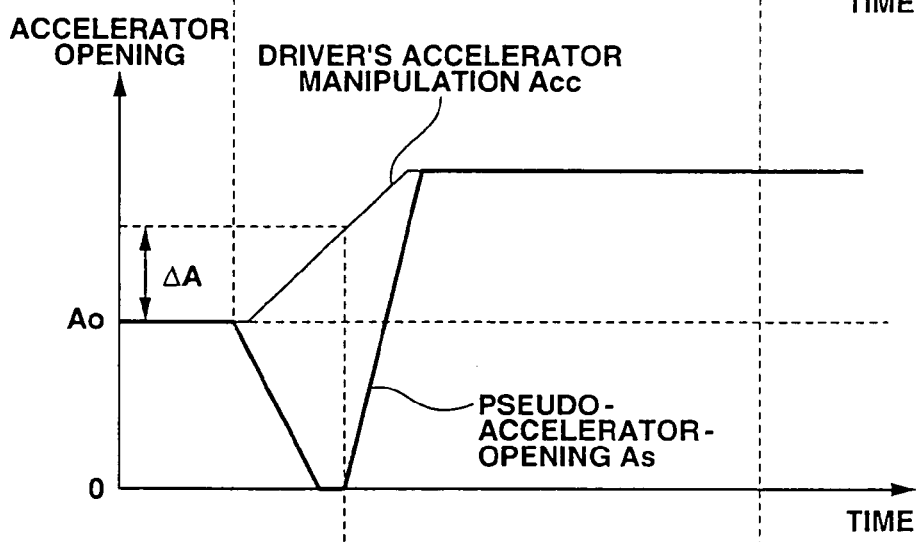
Figure 14C:
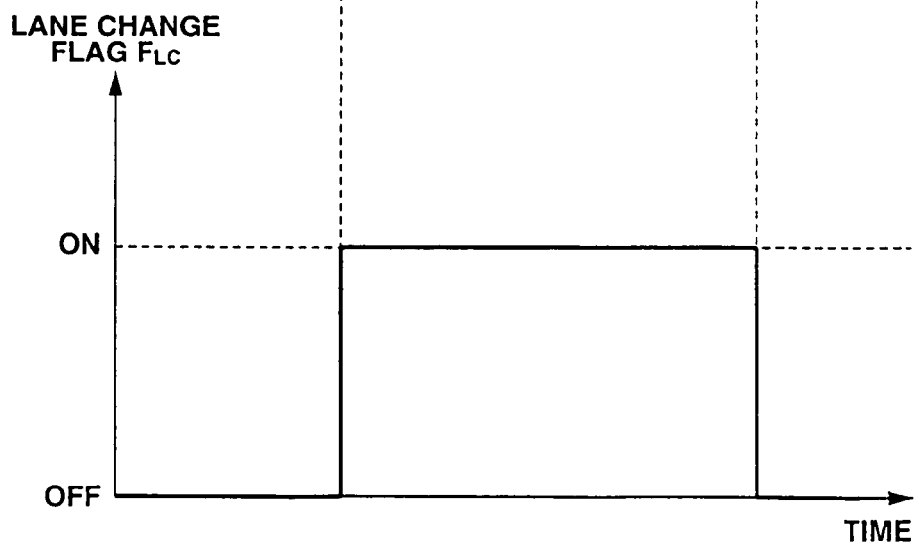

More specifically, as shown in FIGS. 14A, 14B and 14C, when lane deviation determination flag $F_{LD}$ is set at ON and lane change flag $F_{LC}$ is set at OFF, pseudo-accelerator-opening Ac is set at a value which gradually decreases from an initial value A0 to zero wherein initial value A0 is the accelerator opening Acc taken at a moment that lane deviation determination flag FLD is changed to ON.

Further, when lane deviation determination flag $F_{LD}$ is set at ON and lane change flag $F_{LC}$ is set at ON, pseudo-accelerator-opening As is set at a value which gradually increases from a pseudo-accelerator-opening As taken at a moment that both of lane deviation determination flag $F_{LD}$ and lane change flag $F_{LC}$ are changed to ON, to a value which corresponds with newest accelerator opening Acc. When pseudo-accelerator-opening As corresponds with the newest accelerator opening Acc which is sequentially read, pseudo-accelerator-opening As is set at newest accelerator opening Acc hereinafter.

Further, when lane deviation determination flag $F_{LD}$ is set at OFF, pseudo-accelerator-opening As is set at a value which gradually increases from the pseudo-accelerator-opening As taken at a moment that both of lane deviation determination flag $F_{LD}$ is changed to OFF, to a value which corresponds with newest accelerator opening Acc.

After the calculation of pseudo-accelerator-opening As, the routine proceeds to step S56 wherein VSCU 8 calculates target yawing moment Ms which is generated in the host vehicle to suppress the lane deviation. This processing executed at step S56 is the same as the processing executed at step S5 of the first embodiment, and therefore the explanation thereof is omitted herein.

At step S57 subsequent to the execution of step S56, VSCU 8 calculates the target braking force. This processing executed at step S57 is the same as the processing executed at step S6 of the first embodiment, and therefore the explanation thereof is omitted herein.

At step S58 subsequent to the calculation of he target driving force at step S57, VSCU 8 outputs a control signal to driving torque control unit 12 to generate the target driving force according to pseudo-accelerator-opening As calculated at step S55. As shown in FIGS. 14A, 14B and 14C, when deviation determination flag $F_{LD}$ is set at OFF and there is no lane deviation tendency, a driving force is generated according to accelerator opening Acc. When deviation determination flag $F_{LD}$ is set at ON and lane change flag FLC is set at ON that is, it is determined that the lane change is being executed, a driving force is gradually increased to the driving force according to accelerator opening Acc so as to generate the driving force according to accelerator opening Acc.

At step S58 VSCU 8 outputs signals indicative of the target brake hydraulic pressures for the respective wheels, which was calculated at step S57, to brake hydraulic pressure control circuit 7. When deviation determination flag $F_{LD}$ is set at ON, VSCU 8 executes an alarm processing of informing that the host vehicle is put in the lane deviation tendency, by operating an alarm monitor 23. Then, the routine returns to the main program.

Subsequently there is discussed a manner of operation of the lane deviation avoidance system of the fifth embodiment according to the present invention. When the host vehicle travels on a center of the traveling lane, estimated lateral displacement Xs calculated at step S52 satisfies neither $Xc \geqq Xc$ nor $Xs \leqq -Xc$, and therefore deviation determination flag $F_{LD}$ is set at OFF by the execution of step S53. Accordingly, target yawing moment Ms is set at zero (Ms=0), and therefore yawing moment for lane avoidance is not generated since $F_{LD}$=OFF. That is, when the host vehicle is not put in the lane deviation tendency, the yawing moment for the lane deviation avoidance is not generated.

Further, when deviation determination flag $F_{LD}$ is set at OFF and accelerator opening Acc according to a depression quantity of an accelerator pedal depressed by the driver is set as pseudo-accelerator-opening As, pseudo-accelerator-opening As is continuously set so as to be correspond with accelerator opening Acc sequentially read. Therefore, the target driving force according to the accelerator manipulation quantity manipulated by the driver is generated, and therefore the host vehicle performs a vehicle behavior according to the driving manipulation of the driver.

When the host vehicle is put in the lane deviation tendency of deviating from the traveling lane toward the left hand side so as to increase estimated lateral displacement Xs from the non deviation state and estimated lateral displacement Xs becomes greater than or equal to deviation determination threshold Xc ($Xs \geqq Xc$), deviation determination flag $F_{LD}$ is set at ON by the execution of step S53. Therefore, an initial value $A_0$ of an accelerator opening of determining the lane change is set at accelerator opening Acc at this moment. If the driver does not have the lane change intent and the host vehicle is put in the lane deviation tendency without the driver's intent at this moment, the fluctuation of accelerator opening Acc is small thereafter. Accordingly, when accelerator opening Acc is smaller than the sum of initial value A0 and increment threshold $\Delta A$ (Acc<A0+$\Delta A$), lane change flag $F_{LC}$ is maintained at OFF, and therefore pseudo-accelerator-opening As is set at a value which gradually decreases from initial value $A_0$. Thereafter pseudo-accelerator-opening As reaches zero (As=0).

Correction gain Kas gradually increases from 0% and reaches 100% according to the decrease of pseudo-accelerator-opening As, as shown in FIG. 4. Thus, the driving force according to pseudo-accelerator-opening As is generated, and target yawing moment Ms is calculated according to correction gain Kas. Accordingly, when it is determined that the host vehicle is put in the lane deviation tendency, the driving force to be generated is gradually decreased and reaches zero relative to the manipulation quantity of the accelerator pedal. On the other hand, target yawing moment Ms, which has been limited by correction gain Kas, gradually increases as the driving force decreases. Therefore, the braking force control is executed so as to generate target yawing moment Ms according to the lane deviation quantity.

When it is determined that the host vehicle is put in the lane deviation tendency and a braking force is generated to generate target yawing moment Ms for avoiding the lane deviation, the driving force is decreased even if the accelerator pedal is depressed. Accordingly, no interference causes between the driving force according to the accelerator pedal manipulation and the braking force for avoiding the lane deviation. This enables the yawing moment for avoiding the lane deviation to be sufficiently generated. Therefore, the lane deviation avoidance system according to the present invention sufficiently ensures the advantages of the lane deviation avoiding control.

When the host vehicle is recovered from the deviation tendency by generating target yawing moment Ms or executing the steering manipulation of the driver, that is, when deviation determination flag $F_{LD}$ is changed to OFF, pseudo-accelerator-opening As is gradually increased from zero to the sequentially updated accelerator opening Acc. Correction gain Kas is decreased and target yawing moment Ms is suppressed as pseudo-accelerator-opening As increases. The driving force actually generated relative to the target accelerator opening manipulation quantity is gradually recovered, and the driving force according to the accelerator pedal manipulation quantity is then generated as pseudo-accelerator-opening As increases.

When target yawing moment Ms is generated under the lane deviation tendency, the driving force is decreased without generating the driving force according to the manipulation quantity of the accelerator pedal. Therefore, it becomes possible to avoid the interference between the braking force for generating target yawing moment Ms and the driving force and to sufficiently ensure the control effect for the lane deviation avoidance. Further, since target yawing moment Ms is recovered from the suppressed condition according to pseudo-accelerator-opening As, it become possible to lower the driving force and to recover target yawing moment Ms. This enables the accurate avoidance of the interference between the driving force and the braking force necessary for generating target yawing moment Ms.

On the other hand, when the driver executes a steering operation and depresses the accelerator pedal for the purpose of the lane change, initial value A0 is set at the accelerator opening Acc at a moment that lane deviation determination flag FLD is changed to ON, as show in FIGS. 14A, 14B and 14C. When the fluctuation quantity of the accelerator opening Acc during an initial period of the lane change is small, accelerator opening Acc is smaller than the sum of initial value A0 and accelerator opening increment threshold ΔA (Acc<A0+ΔA). Therefore, at this moment, it is determined that the driver does not have the lane change intent, and lane change flag $F_{LC}$ is maintained at OFF.

Accordingly, target driving force is gradually decreased since pseudo-accelerator-opening As is set so as to be gradually decreased from initial value A0 to zero. However, since correction gain Kac is increased according to the decrease of pseudo-accelerator-opening As, target yawing moment Ms is gradually increased. Accordingly, the yawing moment for the lane deviation avoidance is gradually applied to the host vehicle and the driving force is gradually decreased in response to the gradual increase of the yawing moment.

When the fluctuation quantity of accelerator opening Acc becomes greater than or equal to ΔA, it is determined that the driver has the lane change intent and therefore lane change flag $F_{LC}$ is set at ON is gradually decreases Pseudo-accelerator-opening As is set to gradually increase and to correspond with newly updated accelerator opening Acc, as shown in FIGS. 14A, 14B and 14C. Correction gain Kas is set to gradually decrease from 100% to 0% according to the increase of pseudo-accelerator-opening As as shown in FIG. 4. Accordingly, target yawing moment Ms is gradually decreased.

When lane change flag $F_{LC}$ is set at ON, the driving force is increased and target yawing moment Ms is suppressed. Therefore, the driving force is generated according to the manipulation quantity of the accelerator pedal, and target yawing moment Ms is suppressed and reaches zero later. That is, since during the lane change the yawing moment for the lane deviation avoidance is not generated, the driver does not have a strange feeling such as an unsmooth vehicle speed change, and it becomes possible to realize the traveling control of the host vehicle according to the lane change intent of the driver.

When the host vehicle travels on a center of the changed lane after the lane change is terminated and lane deviation quantity Xs of the host vehicle becomes smaller than lane deviation threshold Xc (Xs<Xc), lane deviation flag $F_{LD}$ is changed to OFF and lane change flag FLC is also changed to OFF.

Since target yawing moment Ms is set at zero and pseudo-accelerator-opening As is set at accelerator opening Acc, the host vehicle is returns to the traveling condition according to the accelerator pedal manipulation by the driver.

When the driver has the lane change intent as a result of determining from the changing condition of accelerator opening Acc as to whether the driver has the lane change intent, target yawing moment Ms is suppressed and the driving force is generated according to the depression quantity of the accelerator pedal. Therefore, when the host vehicle is put in the lane deviation tendency due to the lane change intent, it becomes possible to avoid the driver from having a strange feeling such as an unsmooth speed change caused by the application of the yawing moment for the lane change avoidance.

Further, when target yawing moment Ms is generated during this period, the driving force according to accelerator opening Acc is decreased. Therefore, it becomes possible to avoid the interference between the demanded driving force demanded by the driver and the braking force for generating target yawing moment Ms and to sufficiently ensure the control effect for the lane deviation avoidance by firmly generating the yawing moment.

The fifth embodiment is arranged to gradually vary pseudo-accelerator-opening As at a predetermined rate as shown in FIGS. 14A through 14C and to vary correction gain Kas set according to pseudo-accelerator-opening As at a predetermined rate as shown in FIG. 4. Therefore, when the lane deviation and/or the lane change are detected, this arrangement suppresses a large fluctuations of the target driving force and target yawing moment Ms calculated based on pseudo-accelerator-opening As and correction gain Kas and prevents the vehicle behavior from largely changing.

In case that the determination as to whether the driver has the lane change intent is executed on the basis of the operation signal of turn indicator switch, there is a possibility that an erroneous determination is made such that the driver has the lane change intent when the turn indicator switch is erroneously manipulated without having the lane change intent. However, since the fifth embodiment according to the present invention is arranged to execute the determination of the lane change intent on the basis of the changing condition of accelerator opening Acc under the lane deviation tendency detected condition, it is possible to determine the lane change intent at the moment that the lane change is actually executed. This arrangement enables the accurate determination as to the lane change intent and the accurate control fitted with the driver's intent.

Although the fifth embodiment according to the present invention has been shown and described such that the driving force is recovered and the yawing moment is decreased when the lane change is detected, either of the recovery of the driving force or the decrease of the yawing moment may be executed when the lane change is detected. In case that only the recovery of the driving force is executed, there is a tendency of causing the interference between the driving force and the braking force for generating the yawing moment. On the other hand, in case that only the decrease of the yawing moment is executed, there is caused a possibility of causing the shortage of the driving force. Therefore, it is preferable that both of the recovery of the driving force and the decrease of the yawing moment are executed.

Subsequently there is discussed a sixth embodiment of the lane deviation avoidance system according to the present invention.

The sixth embodiment is basically the same as the first embodiment except that the procedure of the calculation processing executed by VSCU 8, and therefore the explanation of the same parts is omitted herein.

Figure 15:
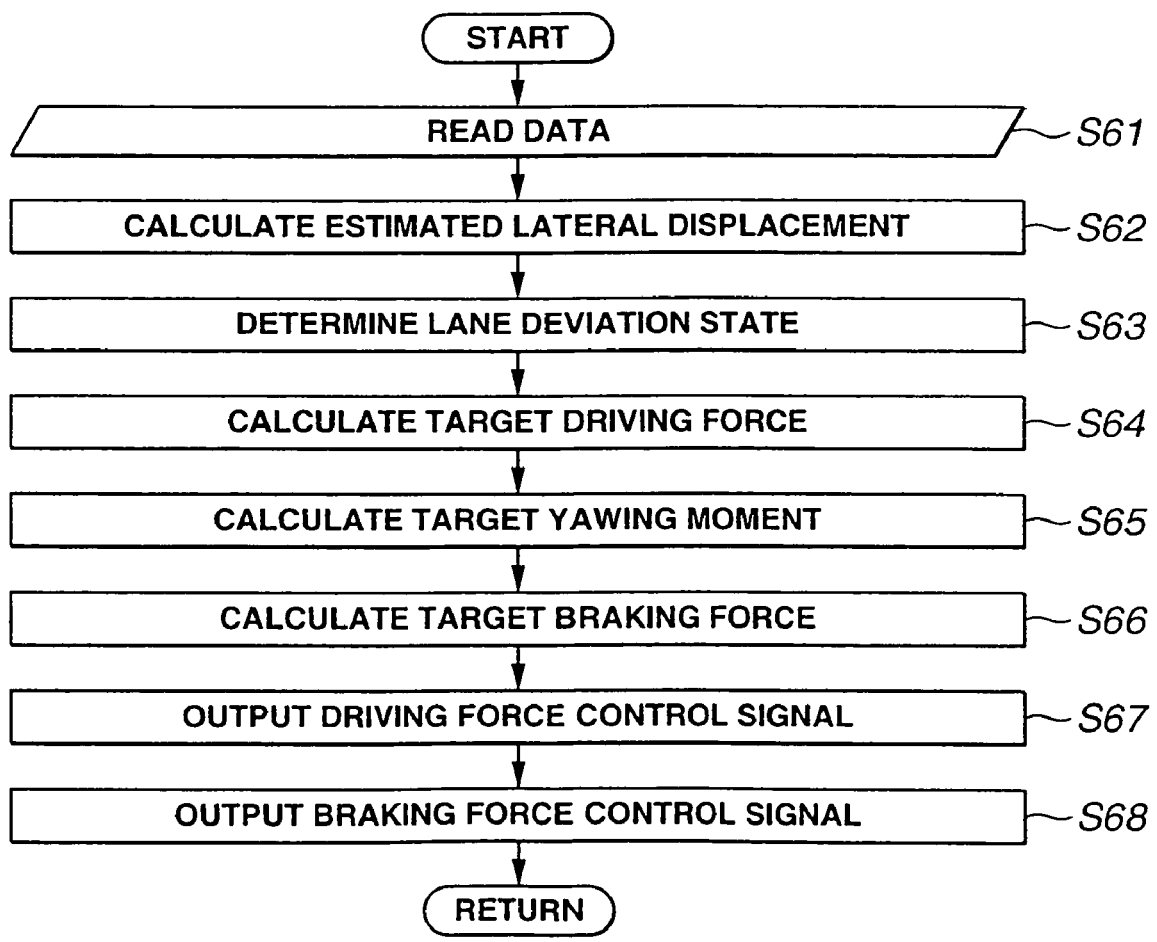
FIG. 15 is a flowchart showing a processing executed in a sixth embodiment according to the present invention.

The sixth embodiment according to the present invention is arrange to execute the processing shown by a flowchart of FIG. 15. Steps S61 through S63 are basically same as steps S1 through S3 in the first embodiment. That is, various data is read at step S61, estimated lateral displacement Xs is calculated on the basis of the read data at step S62, and the determination as to the lane deviation state is executed at step S63.

Figure 16:
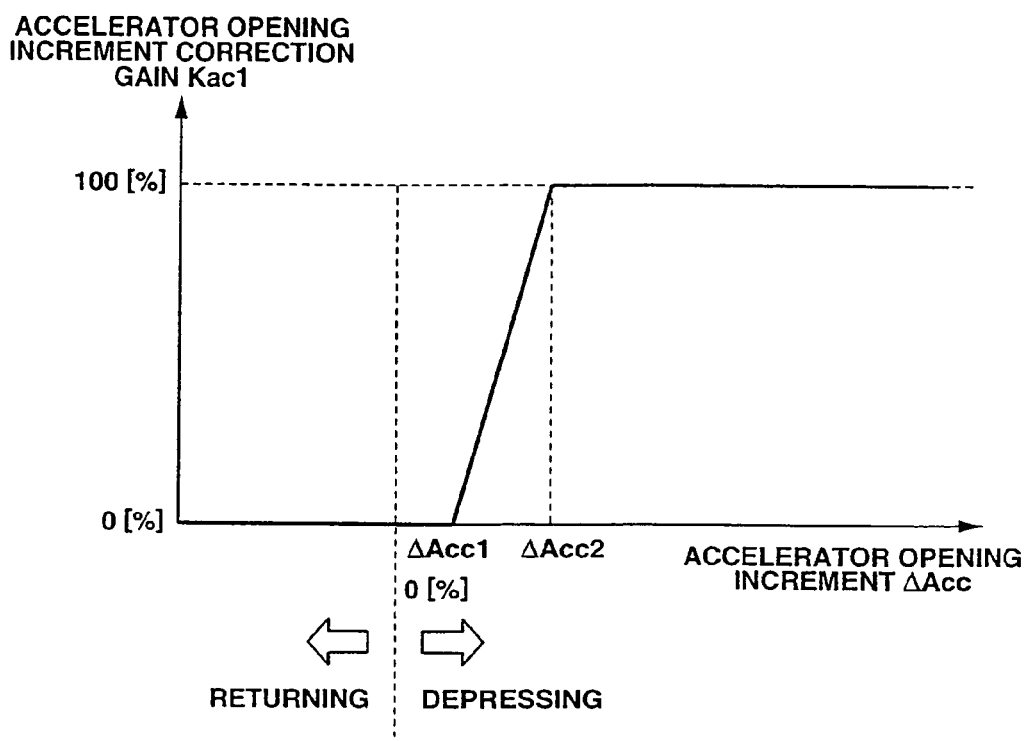
FIG. 16 is a control map employed in the processing of the sixth embodiment.

Subsequently at step S64, VSCU 8 calculates a pseudo-accelerator-opening As2 which corresponds to an accelerator opening of the target driving force. More specifically, when lane deviation determination flag $F_{LD}$ is set at OFF, pseudo-accelerator-opening As2 is set at accelerator opening Acc. When lane deviation determination flag $F_{LD}$ is set at ON, pseudo-accelerator-opening As2 is calculated using the following expression (22).

$$As2 = Ka1 \times Acc \tag{22}$$

where Ka1 is a correction gain which is set so as to increase from an initial value A0, which is an accelerator opening Acc taken at a moment that lane deviation determination flag $F_{LD}$ is changed to ON, at a rate of an increment ΔAcc of the accelerator opening. More specifically, as shown in FIG. 16. In FIG. 16, a horizontal axis denotes an accelerator opening increment ΔAcc, and a vertical axis denotes a correction gain Kac1.

Under a condition that accelerator opening increment ΔAcc is changed in the depression increasing direction, when accelerator opening increment ΔAcc is in a first range smaller than a first threshold ΔAcc1, correction gain Kac1 is set at 0%. When accelerator opening increment ΔAcc is in a second range which is greater than first threshold ΔAcc1 and smaller than a second threshold ΔAcc2, correction gain Kac1 is increased in proportion to the increase of accelerator opening increment ΔAcc. When accelerator opening increment ΔAcc is in a third range greater than second threshold ΔAcc2, correction gain Kac1 is set at 100%. Further, when the accelerator opening Acc is changed to the releasing direction, correction gain Kac1 is set at 0%.

That is, when the host vehicle is put in the lane deviation tendency and accelerator opening increment ΔAcc is relative large, it is determined that the possibility of the lane change is high. Therefore, the driving force according to accelerator opening Acc is generated by setting correction gain Kac1 at 100% and setting the target driving force corresponding to pseudo-accelerator-opening As2 at the driving force according to accelerator opening Acc. On the other hand, when the host vehicle is put in the lane deviation tendency and accelerator opening increment ΔAcc is relatively small, it is determined that the possibility of the lane change is low and there is a possibility of the lane deviation. Therefore, the driving force is decreased by setting correction gain Kac1 at a value smaller than 100% and setting the target driving force corresponding to pseudo-accelerator opening As2 at the value obtained by suppressing the driving force according to accelerator opening Acc.

In case that pseudo-accelerator-opening As2 is changed according to the change of lane deviation determination flag $F_{LD}$, it is gradually changed so as to prevent the target driving force from largely changing the target driving force by limiting the changing quantity of pseudo-accelerator-opening As2 as is similar to the manner of the fifth embodiment.

After the calculation of pseudo-accelerator-opening As, the routine proceeds to step S65 wherein VSCU 8 calculates target yawing moment Ms2 to be generated in the host vehicle to avoid the lane deviation. More specifically, when lane deviation determination flag $F_{LD}$ is set at OFF, target yawing moment Ms2 is set at zero (Ms2=0). When lane deviation determination flag $F_{LD}$ is set at ON, target yawing moment Ms2 is calculated on the basis of the difference (deviation quantity) between estimated lateral displacement Xs and lane deviation determination threshold Xc. When estimated lateral displacement Xs is greater than or equal to lane deviation determination threshold Xc, target yawing moment Ms2 is calculated using the following expression (23). When estimated lateral displacement Xs is smaller than or equal to lane deviation determination threshold −Xc, target yawing moment Ms2 is calculated using the following expression (24). Herein, a yawing moment directed to a clockwise direction is treated as a positive value. In the expressions (23) and (24), K1 is a proportional coefficient determined from the specifications of the host vehicle, K2 is a proportional coefficient set according to vehicle speed V of the host vehicle, and Kas2 is a correction gain set according to the accelerator opening increment ΔAcc taken at a moment that lane deviation determination flag $F_{LD}$ is changed to ON and is set as shown in FIG. 17.

$$Ms2 = -K1 \times K2 \times Kac2 \times (Xs - Xc) \tag{23}$$

$$Ms2 = -K1 \times K2 \times Kac2 \times (Xs + Xc) \tag{24}$$

Figure 17:
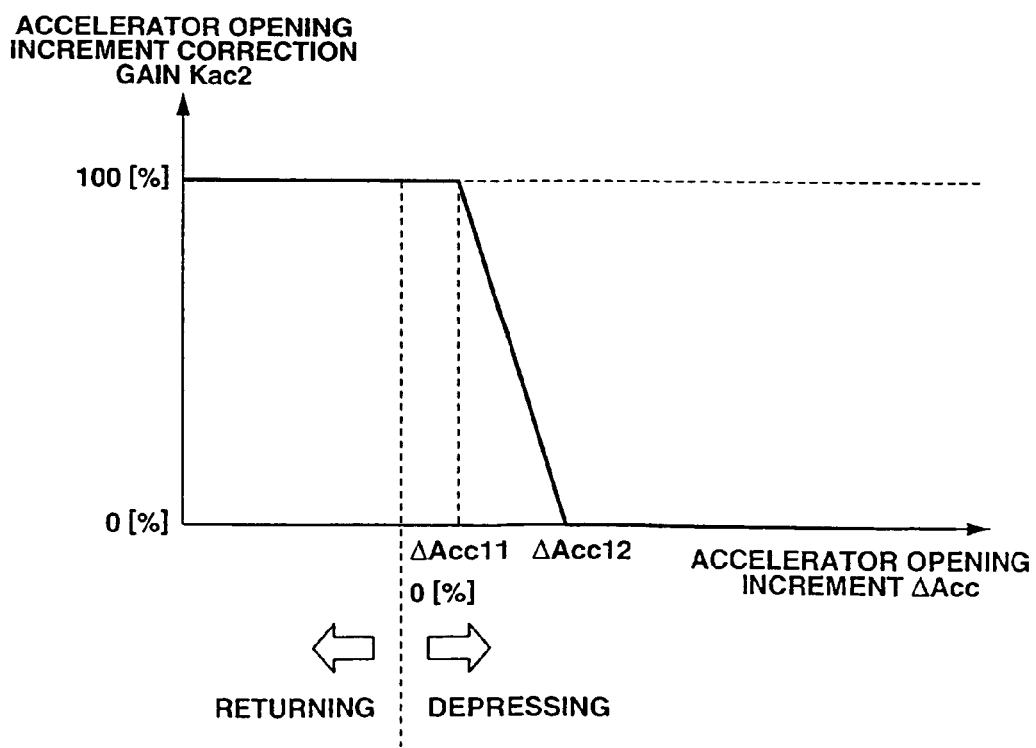
FIG. 17 is a control map employed in the processing of the sixth embodiment.

In FIG. 17, a horizontal axis denotes accelerator opening increment ΔAcc and a vertical axis denotes correction gain Kac2. As shown in FIG. 17, in case that accelerator opening increment ΔAcc changes in the depression increasing direction and when accelerator opening increment ΔAcc is in a range smaller than a first threshold Acc11, correction gain Kac2 is set at 100%. When accelerator opening increment ΔAcc is in a range between first threshold Acc11 and a second threshold Acc12 greater than first threshold Acc11, correction gain Kac2 decreases in inverse proportion to the increase of accelerator opening increment ΔAcc. When accelerator opening increment ΔAcc is in a range greater than second threshold Acc12, correction gain Kac2 is set at 0%. Further, in case that accelerator opening is changed in the returning direction of the accelerator pedal, correction gain Kac2 is set at 100%.

That is, when it is predicted that the possibility of the lane change is high for the reason that the host vehicle is put in the lane deviation tendency and accelerator opening increment ΔAcc is large, target yawing moment Ms2 is suppressed at zero by setting correction gain Kac2 at 0% so as to avoid the yawing moment from being generated during the lane change. On the other hand, when it is predicted that the possibility of the lane change is low for the reason that the host vehicle is put in the lane deviation tendency and accelerator opening increment ΔAcc is relatively small, correction gain Kas2 is set at a value greater than 0% and the yawing moment is generated by not suppressing the target yawing moment, so as to quickly execute the lane deviation avoidance of the host vehicle.

After the calculation of target yawing moment Ms2, the routine proceeds to step S66 wherein VSCU 8 calculates the target braking force. More specifically, The calculation processing at step S66 is basically similar to the calculation processing at step S57 in the fifth embodiment, except that target yawing moment Ms2 is used instead of target yawing moment Ms used in the calculation processing at step S57.

Subsequently at step S67, VSCU 8 outputs the control signal to driving torque control unit 12 so as to generate the driving force according to pseudo-accelerator-opening Ac2 calculated step S14, as is similar to the calculation processing at step S58 in the fifth embodiment.

At step S68 subsequent to the execution of step S67, VSCU 8 outputs target brake hydraulic pressure Psi of each wheel to brake hydraulic pressure control circuit 7. When lane deviation determination flag $F_{LD}$ is set at OFF, a processing of operating alarm monitor 23 is executed. Thereafter, the routine returns to the main program.

Subsequently there is discussed the manner of operation of the sixth embodiment according to the present invention.

When the host vehicle travels on a center of the traveling lane, estimated lateral displacement Xs calculated at step S62 satisfies neither Xc≧Xc nor Xs≦−Xc, and therefore deviation determination flag $F_{LD}$ is set at OFF by the execution of step S63. Accordingly, target yawing moment Ms2 is set at zero (Ms2=0) since $F_{LD}$=OFF. Further the driving force according to accelerator opening Acc is not suppressed, the yawing moment for the lane deviation avoidance is not generated. Therefore, the driving force according to the manipulation quantity of the accelerator pedal manipulated by the driver is generated, and the host vehicle performs the vehicle behavior according to the driver's manipulation.

When the host vehicle is put in the lane deviation tendency of deviating from the traveling lane toward the left hand side so as to increase estimated lateral displacement Xs from the non deviation state and estimated lateral displacement Xs becomes greater than or equal to deviation determination threshold Xc (Xs≧Xc), deviation determination flag $F_{LD}$ is set at ON by the execution of step S63. Therefore, an initial value $A_0$ of an accelerator opening for determining the lane change intent is set at accelerator opening Acc at this moment.

If the driver does not have the lane change intent and the host vehicle is put in the lane deviation tendency without the driver's intent at this moment, the fluctuation of accelerator opening Acc is small thereafter. Accordingly, correction gain Kac1 employed in the calculation of pseudo-accelerator-opening As2 is set at a value adjacent to 0% as shown in FIG. 16, and pseudo-accelerator-opening As2 is set at accelerator opening Acc suppressed in the vicinity of zero by the execution of step S64. Further, since accelerator opening increment ΔAcc is small, correction gain Kac2 employed in the calculation of target yawing moment Ms2 is set at a value in the vicinity of 100%. Therefore target yawing moment Ms2 calculated according to the deviation quantity of the host vehicle is not so suppressed by the execution of step S65.

Consequently the yawing moment sufficient for suppressing the lane deviation is generated and the generation of the driving force according to accelerator opening Acc is suppressed, and the interference between the braking force for generating the target yawing moment for the lane deviation avoidance and the driving force demanded by the driver is prevented. As a result, the target yawing moment necessary for the avoidance of the lane deviation of the host vehicle is generated and the control effect of the lane deviation avoidance is sufficiently ensured.

When the host vehicle is recovered from the lane deviation tendency by generating target yawing moment Ms2 or executing the steering manipulation by the driver and lane deviation determination flag $F_{LD}$ is changed to OFF, pseudo-accelerator-opening As2 is set so as to gradually increase from zero to the newly read accelerator opening Acc, and target yawing moment Ms2 is set at zero. Therefore, the generation of the yawing moment is terminated, and the actually generated driving force relative to accelerator opening Acc is gradually recovered according to the increase of pseudo-accelerator-opening As2, and the driving force according to accelerator opening Acc is generated as last.

When the driver recognizes the lane deviation tendency under the lane deviation tendency condition and returns the accelerator pedal, as shown in FIG. 16, correction gain Kac1 is gradually decreased. Further, when the accelerator pedal is further retuned to a position shallower than the initial position, correction gain Kac1 is maintained at 0%. Accordingly, even if the accelerator pedal is returned under the lane deviation tendency condition, the driving force is suppressed similarly, when the accelerator pedal is returned, as shown in FIG. 17, correction gain Kac2 is gradually increased. Further, when the accelerator pedal is further returned to the position shallower than the initial position, correction gain Kac2 is maintained at 100%. Accordingly even if the accelerator pedal is retuned under the lane deviation tendency condition, target yawing moment Ms2 sufficient to suppressing the lane deviation is generated. Further, since the lane deviation avoidance system of the sixth embodiment is arranged to ensure target yawing moment Ms2 and to decrease the driving force during this period, it becomes possible to ensure the control effect of the lane deviation avoidance by means of the yawing moment without causing the interference between the braking force for generating the target yawing moment and the driving force.

On the other hand, when the driver executes a steering operation and depresses the accelerator pedal for the purpose of the lane change, initial value A0 is set at the accelerator opening Acc at a moment that lane deviation determination flag $F_{LD}$ is changed to ON. When the fluctuation quantity of the accelerator opening Acc during an initial period of the lane change is small, accelerator opening increment ΔAcc is small. Therefore, at this moment, corrosion gain Kac1 employed in the calculation of pseudo-accelerator-opening As2 is set at a relatively small value, and correction gain Kac2 employed in the calculation of target yawing moment Ms2 is set at a relatively large value. Therefore, target yawing moment Ms2 according to the lane deviation quantity is generated and the driving force is suppressed. However, when accelerator opening increment ΔAcc is increased according to the depression of the accelerating pedal for the purpose of the lane change, correction gain Kac1 is also increased according to the increase of accelerator opening increment ΔAcc and reaches a value adjacent to 100%. Therefore, target yawing moment Ms is suppressed and the suppression of pseudo-accelerator-opening is cancelled.

Since the driving force according to the manipulation quantity of the accelerator pedal is generated and target yawing moment Ms is suppressed and not generated, the interference between the driving force and the braking force for generating target yawing moment Ms is prevented and the driving force necessary for the lane change is sufficiently generated. Inversely, it becomes possible to avoid the driver from having a strange feeling caused by the yawing moment during the lane change.

When the host vehicle travels on a center of the changed lane after the lane change is terminated and lane deviation quantity Xs of the host vehicle becomes smaller than lane deviation threshold Xc (Xs<Xc), lane deviation flag $F_{LD}$ is changed to OFF. Further, since target yawing moment Ms2 is set at zero (Ms2=0) and pseudo-accelerator-opening As is set at accelerator opening Acc, the host vehicle is returns to the traveling condition according to the accelerator pedal manipulation by the driver.

Consequently, the sixth embodiment according to the present invention gains the advantages gained by the fifth embodiment according to the present invention.

Since the sixth embodiment is arranged to limit the changing quantities of correction gains Kac1 and Kac2 as shown in FIGS. 16 and 17, the changing quantities of pseudo-accelerator-opening As and target yawing moment Ms2, which are calculated on the basis of correction gains Kac1 and Kac2, is capable of being limited. Therefore, it becomes possible to avoid the radical change of the driving force and/or the yawing moment during the lane deviation detected condition and/or the lane change condition.

Subsequently there is discussed a seventh embodiment of the lane deviation avoidance system according to the present invention.

The seventh embodiment is basically the same as the first embodiment except that the procedure of the calculation processing executed by VSCU 8, and therefore the explanation of the same parts is omitted herein.

Figure 18:
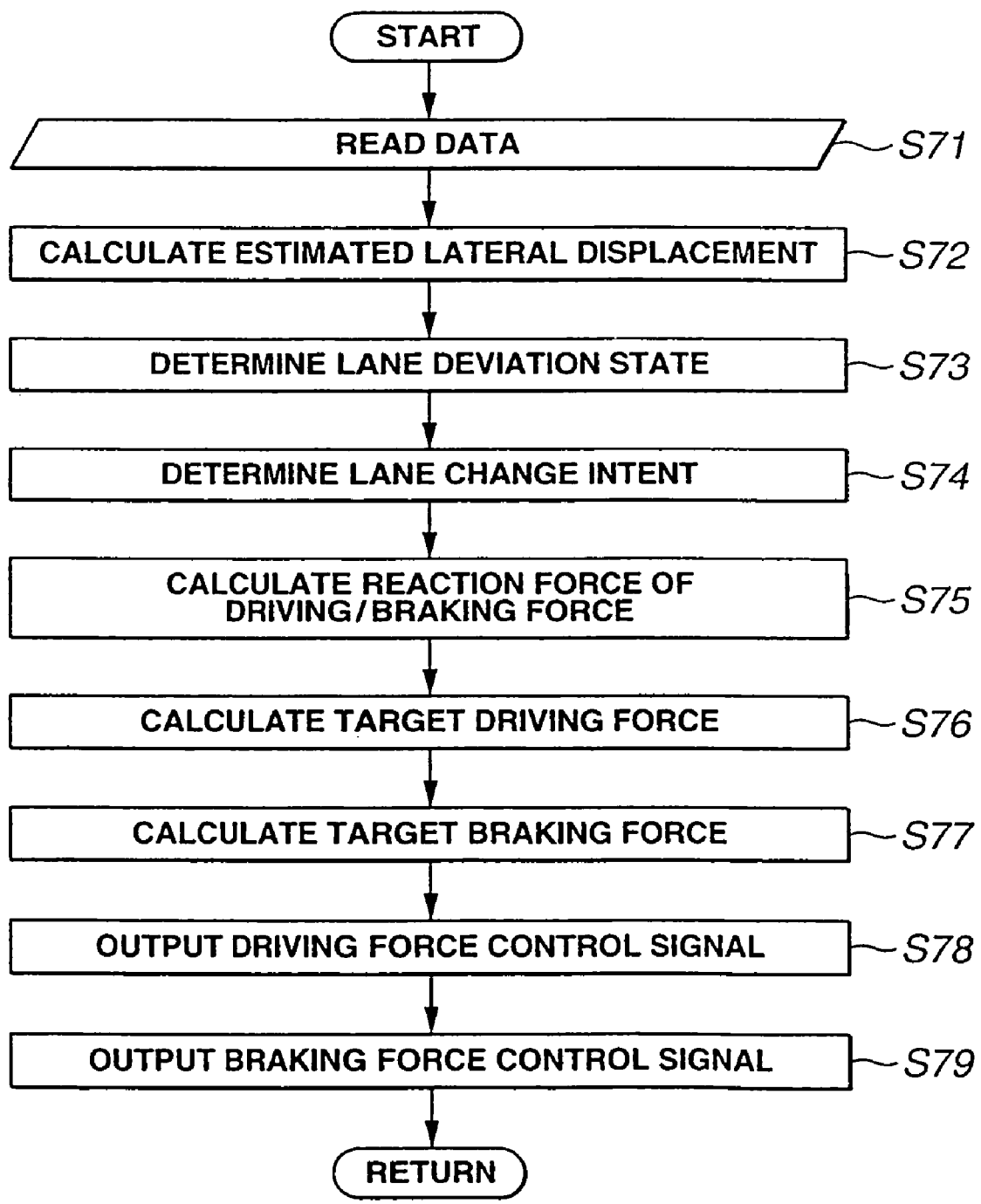
FIG. 18 is a flowchart showing a processing executed in a seventh embodiment according to the present invention.

The seventh embodiment according to the present invention is arrange to execute the processing shown by a flowchart of FIG. 18. Steps S71 through S73 are basically same as steps S1 through S3 in the first embodiment. That is, various data is read at step S71, estimated lateral displacement Xs is calculated on the basis of the read data at step S72, and the determination as to the lane deviation state is executed at step S73. Additionally, in the processing at step S71, VSCU 8 further calculates a demanded driving force τm.

At step S74 subsequent to the execution of step S73, VSCU 8 determines the lane change intent, and more specifically, determines whether or not the driver has the lane change intent. More specifically, when a difference between the sequentially read demanded driving force τm and an initial value Td is greater than or equal to a predetermined value Δt, VSCU 8 determines that the host vehicle is put in the lane change condition, and therefore the lane change flag $F_{LC}$ is set at ON ($F_{LC}$=ON) Herein, an initial value τd is the demanded driving force τm calculated at a moment that lane deviation determination flag $F_{LD}$ is changed to ON. When demanded driving force τm becomes smaller than or equal to initial value τd (τm≦τd) after it is determined that the host vehicle is put in the lane change condition, VSCU 8 determines that the lane change is terminated or cancelled and lane change flag $F_{LC}$ is set at OFF ($F_{LC}$=OFF) Lane change flag $F_{LC}$ may be changed to OFF when lane deviation determination flag $F_{LD}$ is changed to OFF.

Although the seventh embodiment according to the present invention has been shown and described such that lane change flag $F_{LC}$ is changed to OFF when demanded driving force τm becomes smaller than or equal to initial value τd, the determination is not limited to this. For example, lane change flag $F_{LC}$ may be changed to OFF when demanded driving force τm becomes smaller than a value which is smaller than the sum of initial value τd and increment threshold Δt, or lane change flag $F_{LC}$ may be changed to OFF when lane deviation determination flag $F_{LD}$ is changed to OFF. Increment threshold Δt of demanded driving force τm may be set at a fixed value. Further, as is similar to increment threshold ΔAcc of accelerator opening Acc discussed in the sixth embodiment, increment threshold Δτ of demanded driving force τm may be varied according to demanded driving force τm or vehicle speed V.

At step S75 VSCU 8 calculates driving/braking-force reaction force τc which corresponds to an estimated reaction force reacting against a driving force generated according to demanded driving force τm when a braking force necessary for obtaining a necessary deceleration force of avoiding the lane deviation. Driving/braking-force reaction force τc is calculated on the basis of lane deviation determination flag $F_{LD}$, lane change flag $F_{LC}$ and deviation quantity (Xs−Xc) of the host vehicle form the traveling lane. More specifically, when lane deviation determination flag $F_{LD}$ is set at ON and lane change flag $F_{LC}$ is set at OFF and estimated lateral displacement Xs is greater than or equal to Xc, driving/braking-force reaction force τc is calculated using the following expression (25). When lane deviation determination flag $F_{LD}$ is set at ON and lane change flag FLC is set at OFF and estimated lateral displacement Xs is smaller than or equal to −Xc, driving/braking-force reaction force τc is calculated using the following expression (26). When both of lane deviation determination flag $F_{LD}$ and lane change flag FLC are set at ON, or when lane deviation determination flag $F_{LD}$ is set at OFF, driving/braking-force reaction force τc is set at zero (τc=0). When driving/braking-force reaction force τc is changed according to the change of lane change flag $F_{LC}$ and/or lane deviation determination flag $F_{LD}$, the changing quantity thereof is limited so as to be gradually changed.

$$\tau c = K21 \times K22 \times |Xs-Xc| \quad (25)$$

$$\tau c = K21 \times K22 \times |Xs+Xc| \quad (26)$$

where K21 is a proportional coefficient determined from specifications of the host vehicle and K22 is a proportional coefficient which varies according to vehicle speed V.

At step S76 VSCU 8 calculates a target driving force τc on the basis of demanded driving force τm calculated at step S71, driving/braking-force reaction force τc calculated at step S75.

This processing executed at step S76 is the same as the processing executed at step S15 of the second embodiment, and therefore the explanation thereof is omitted herein.

At step S77 VSCU 8 calculates a target braking force τb. This processing executed at step S77 is the same as the processing executed at step S16 of the second embodiment, and therefore the explanation thereof is omitted herein.

After the calculation of the target braking force in this manner, the program proceeds to step S78 wherein VSCU 8 outputs a driving force control signal to driving torque control unit 12 so as to generate target driving force τb calculated at step S76.

At step S79 VSCU 8 outputs the target brake hydraulic pressure of each wheel to brake hydraulic pressure control circuit 7. When lane deviation determination flag $F_{LD}$ is set at ON, a processing of operating an alarm monitor 23 is executed. Thereafter, the routine returns to a main program.

There is discussed the manner of operation of the lane deviation avoidance system of the seventh embodiment according to the present invention. When the host vehicle travels on a center of the traveling lane, estimated lateral displacement Xs calculated at step S72 satisfies neither Xc≧Xc nor Xs≦−Xc, and therefore deviation determination flag $F_{LD}$ is set at OFF by the execution of step S73, and lane change flag $F_{LC}$ is set at OFF by the execution of step S74. Since lane deviation determination flag $F_{LD}$ is set at OFF, driving/braking force reaction force τc is set at zero by the execution of step S75. Further, target driving force τc is set at demanded driving force τm according to accelerator opening Acc by the execution of step S76, and target braking force τb is set at zero by the execution of step S77.

When the host vehicle is not put in the lane deviation tendency, the deceleration control for the lane deviation avoidance is not executed and the driving force according to accelerator opening Acc is generated. Therefore, the manipulation quantity of the accelerator pedal is generated and the host vehicle performs the vehicle behavior according to the driver's accelerator manipulation.

When the host vehicle is put in the lane deviation tendency toward the left hand side from the non-deviation condition, estimated lateral displacement Xs increases and becomes greater than threshold Xc (Xs≧Xc) and therefore lane deviation determination flag $F_{LD}$ is set at ON by the execution of step S73 ($F_{LD}$=ON) Demanded driving force τm according to accelerator opening Acc at this moment is set as initial value τd. When the driver does not have the lane change intent at this moment, the fluctuation of the depression quantity of the accelerator pedal is small and therefore the fluctuation quantity of demanded driving force τm is small. Accordingly, the fluctuation quantity of demanded driving force τm is smaller than threshold $\Delta\tau$, it is determined that the lane change is not executed and therefore lane change flag $F_{LC}$ is set at OFF.

Therefore, driving/braking-force reaction force $\tau c$ according to the difference between estimated lateral displacement Xs at this moment and threshold Xc is calculated. Target driving force $\tau s$ is set at the value obtained by subtracting driving/braking-force reaction force $\tau c$ from demanded driving force $\tau m$. Target braking force $\tau b$ is set at a shortage of the limited quantity of demanded driving force $\tau m$ relative to driving/braking-force reaction force $\tau c$.

Since the previous value of driving/braking-force reaction force $\tau c$ is zero at this moment, the changing quantity of driving/braking-force reaction force $\tau c$ is limited and is gradually increased from zero until it corresponds with the newly calculated driving/braking force reaction force $\tau c$. Target driving force $\tau s$ is gradually decreased and target braking force $\tau b$ is gradually increased according to the request. When the host vehicle is put in the lane deviation tendency and it is determined that the lane change is not executed, the actually generated driving force is decreased from demanded driving force $\tau m$ according to the manipulation quantity of the accelerator pedal by the driver, and the deceleration corresponding to driving/braking-force reaction force $\tau c$ is executed. Therefore, the interference between the driving force and the control force necessary for the deceleration of the lane deviation avoidance is prevented, and the deceleration is sufficiently executed.

Since the seventh embodiment is arranged to ensure the shortage of driving/braking-force reaction force $\tau c$ relative to demanded driving force $\tau m$ by generating the braking force, it becomes possible to certainly execute the deceleration control corresponding to driving/braking-force reaction force $\tau c$ and to certainly ensure the deceleration controlled quantity necessary for the lane deviation avoidance.

On the other hand, when it is determined that the host vehicle is put in the lane deviation tendency by the driver's operations of steering the host vehicle for the purpose of the lane change and of depressing the accelerator pedal, driving/braking-force reaction force $\tau c$ according to the lane deviation quantity is calculated as discussed above, and target driving force $\tau s$ and target braking force $\tau b$ for realizing the deceleration corresponding to driving/braking-force reaction force $\tau c$ are calculated. On the basis of the calculated target driving force $\tau s$ and target braking force $\tau b$, the deceleration control of the host vehicle and the suppression of the driving force are executed. When the fluctuation quantity of demanded driving force $\tau m$ relative to initial value, which is the demanded driving force taken at a moment that it is determined that the host vehicle is put in the lane deviation tendency, becomes greater than or equal to threshold $\Delta\tau$, it is determined that the lane change is executed, and lane change flag $F_{LC}$ is set at ON.

Therefore, since driving/braking-force reaction force $\tau c$ is changed to zero, the suppression of demanded driving force $\tau m$ is cancelled and therefore the deceleration corresponding to driving/braking-force reaction force $\tau c$ is cancelled. Driving/braking-force reaction force $\tau c$ is gradually varied to zero during this changing operation of driving/braking force reaction force $\tau c$. Accordingly, the generation of the braking force corresponding to the shortage in the deceleration control is gradually cancel from a moment that the lane change is executed, the suppression of the driving force is cancelled, and the driving force corresponding to demanded driving force $\tau m$ is generated. Consequently, the driving force according to the driver's accelerator pedal manipulation is generated and the host vehicle performs the vehicle behavior according to the driver's intent.

When it is detected that the lane change is executed, the deceleration control for the lane deviation avoidance is cancelled. This arrangement avoids the driver from having the unsmooth feeling caused by the execution of the deceleration control.

Further, since target driving force $\tau s$ is calculated by subtracting driving/braking-force reaction force $\tau c$ from demanded driving force $\tau m$, target driving force $\tau s$ increases according to the increase of demanded driving force $\tau m$ increased by the depression quantity of the accelerator pedal. This arrangement enables the driving force to be increased according to the depression quantity of the accelerator pedal, and therefore the host vehicle is capable of being accelerated according to the driver's acceleration intent.

Further, when driving/braking-force reaction force $\tau c$ is changed, the changing quantity thereof is limited such that driving/braking force reaction force $\tau c$ is gradually changed. This prevents the large fluctuations of target driving force $\tau s$ and target braking force $\tau b$ and therefore avoid the vehicle behavior from being largely changed.

When demanded driving force $\tau m$ becomes smaller than or equal to initial value $\tau d$ which is the demanded driving force at a moment that lane deviation determination flag $F_{LD}$ is changed to ON after the lane change is terminated from the above discussed condition, it is determined that the lane change is terminated and lane change flag $F_{LC}$ is set at OFF.

Therefore, driving/braking-force reaction force $\tau c$ is set at zero. In case that target driving force $\tau b$ is generated according to driving/braking-force reaction force $\tau c$, it is gradually decreased, and is then gradually increased. By this arrangement, the generation of the braking force is terminated and the driving force according to demanded driving force $\tau m$ is generated. Therefore, the vehicle behavior according to the driver's intent is recovered.

That is, when the deceleration control for the lane deviation avoidance is executed under the lane deviation tendency, the outputted driving force is not the driving force according to the manipulation quantity of the accelerator pedal but is a driving force obtained by subtracting driving/braking-force reaction force $\tau c$ corresponding to the controlled quantity of the deceleration control from the driving force directly generated according to the manipulation quantity of the accelerator pedal. Therefore, the interference between the deceleration controlled quantity necessary for the deceleration and the driving force according to demanded driving force is avoided, and it becomes possible to sufficiently ensure the control effect for the lane deviation avoidance.

In case that the determination as to the lane change intent is executed on the basis of the operation signal of the turn indicator switch, there is a possibility that an erroneous determination of existing the lane change intent is made if the turn indicator switch is unintentionally manipulated without the lane change intent. However, the seventh embodiment according to the present invention is arranged to determine the lane deviation intent on the basis of the changed condition of demanded driving force $\tau m$, it becomes possible to accurately determine the lane change intent when the lane change is actually carried out. This enables the accurate control adapted to the driver's intent.

Although the fifth through seventh embodiments according to the present invention have been shown and described as to the case that the host vehicle deviates from the traveling lane toward the left hand side, the control for the lane deviation toward the right hand side is executed basically the same as that for the lane deviation toward the left hand side.

In the fifth embodiment, the processing executed at step S53 in FIG. 11 corresponds to a lane deviation detecting means. The processing executed at steps S56, S57 and S59 corresponds to lane deviation avoidance controlling means. Driving torque control unit 12 and engine 9 correspond to driving force generating means. Accelerator opening sensor 18 corresponds to driving force demanded quantity detecting means. The processing executed at step S55 corresponds to driving force suppressing means. The processing executed at step 56 corresponds to lane deviation controlled quantity suppressing means and target yawing moment calculating means. The processing executed at steps S57 and S59 corresponds to yawing moment generating means. The processing executed at step S58 and driving torque control unit 12 corresponds to driving force controlling means. The processing executed at steps S53, S56, S57 and S59 corresponds to lane deviation avoidance controlling means and yawing moment controlling means.

In the sixth embodiment according to the present invention, the processing executed at step S63 in FIG. 16 corresponds to a lane deviation detecting means. The processing executed at steps S65, S66 and S68 corresponds to driving force demanded quantity detecting means. Accelerator opening sensor 18 corresponds to driving force demanded quantity detecting means. The processing executed at step S64 corresponds to target driving force calculating means. Driving torque control unit 12 and engine 8 correspond to driving force generating means.

In the seventh embodiment according to the present invention, the processing executed at step S73 in FIG. 18 corresponds to lane deviation detecting means. The processing executed at steps S75 through S79 corresponds to lane deviation avoidance controlling means. Driving torque control unit 12 and engine 8 correspond to driving force generating means. Accelerator opening sensor 18 corresponds to driving force demanded quantity detecting means. The processing executed at step S74 corresponds to intent estimating means. The processing of calculating driving/braking force reaction force τc according to the existence of the lane change, which is executed at step S75, corresponds to lane deviation avoidance controlled quantity suppressing means and deceleration controlled quantity calculating means. The processing executed at steps S76 through S79 corresponds to deceleration controlling means. The processing of calculating driving/braking-force reaction force τc according to demanded driving force τm and calculating the driving force for realizing the calculated driving/braking force reaction force τc, which is executed at steps S74 through S76 corresponds to target driving force calculating means and driving force suppressing means. The processing of calculating driving/braking force reaction force τc according to the fluctuation quantity of demanded driving force τm and controlling the driving force and the braking force so as to realize driving/braking force reaction force τc, which is executed at steps S74 through S79, corresponds to lane deviation avoidance controlling means and deceleration controlling means. The processing executed at step S78 corresponds to driving force controlling means.

This application is based on Japanese Patent Applications Nos. 2004-030740 and 2004-030741 filed on Feb. 6, 2004 and No. 2004-346289 filed on Nov. 30, 2004 in Japan. The entire contents of these Japanese Patent Applications are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A lane deviation avoidance system comprising:
a calculating unit configured to calculate a target driving force based on a driver's operation of an accelerator pedal;
a driving force generating unit configured to generate a driving force according to the target driving force; and
a control unit configured:
to detect a lane deviation tendency of a host vehicle,
to execute a lane deviation avoidance control of controlling a vehicle behavior of the host vehicle so as to avoid the host vehicle from deviating from a traveling lane of the host vehicle when the lane deviation tendency is detected,
to suppress the driving force when the lane deviation tendency is detected, and
to cancel the lane deviation avoidance control and recover the driving force on the basis of an increase of the driver's operation of the accelerator pedal from a non-zero amount of accelerator pedal operation to an increased amount of accelerator pedal operation after the lane deviation tendency is detected.

2. A lane deviation avoidance system as claimed in claim 1, wherein the control unit is further arranged to suppress a controlled variable of the lane deviation avoidance control on the basis of the driver's operation of the accelerator pedal after the lane deviation tendency is detected.

3. The lane deviation avoidance system as claimed in claim 2, wherein the control unit is further arranged to recover the driving force when the driver's operation of the accelerator pedal becomes greater than a predetermined quantity.

4. The lane deviation avoidance system as claimed in claim 3, wherein the control unit is further arranged to calculate a target yawing moment for avoiding the lane deviation, to generate the target yawing moment, and to suppress the target yawing moment when the driver's operation of the accelerator pedal becomes greater than a predetermined quantity.

5. The lane deviation avoidance system as claimed in claim 3, wherein the control unit is further arranged to calculate a deceleration controlled variable for avoiding the lane deviation, to execute a deceleration control based on the deceleration controlled variable, and to suppress the deceleration controlled variable when the driver's operation of the accelerator pedal becomes greater than a predetermined quantity.

6. The lane deviation avoidance system as claimed in claim 1, wherein the driving force is recovered at a predetermined changing rate.

7. The lane deviation avoidance system as claimed in claim 1, further comprising an accelerator opening detector configured to detect the accelerator opening as the driver's operation of the accelerator pedal, and wherein the control unit is further arranged to recover the driving force when the accelerator opening becomes greater than or equal to a first threshold which is a sum of an incremental value and the accelerator opening taken at a moment that the lane deviation avoidance control is started.

8. The lane deviation avoidance system as claimed in claim 7, wherein the first threshold is varied according to the accelerator opening.

9. The lane deviation avoidance system as claimed in claim 8, wherein the control unit is further arranged to suppress the driving force again when the accelerator opening once becomes greater than the first threshold and becomes smaller than a second threshold which is greater than the first threshold.

10. The lane deviation avoidance system as claimed in claim 9, wherein the second threshold is set at the accelerator opening taken at a moment that the lane deviation avoidance control is started.

11. The lane deviation avoidance system as claimed in claim 1, further comprising an accelerator opening detector configured to detect the accelerator opening as the driver's operation of the accelerator pedal, and wherein the calculating unit is configured to calculate a pseudo-accelerator opening as the target driving force.

12. The lane deviation avoidance system as claimed in claim 1, wherein the increased amount of the driver's operation of the accelerator pedal is an amount by which the driver's operation has increased from a state of the driver's operation taken at a moment that the lane deviation tendency starts to be detected.

13. The lane deviation avoidance system as claimed in claim 12, wherein the control unit is configured to recover the driving force, when the increased amount of the driver's operation of the accelerator pedal reaches a predetermined amount.

* * * * *